(12) United States Patent
Frayne et al.

(10) Patent No.: US 10,151,931 B2
(45) Date of Patent: *Dec. 11, 2018

(54) ADVANCED RETROREFLECTING AERIAL DISPLAYS

(71) Applicant: Looking Glass Factory, Inc., Brooklyn, NY (US)

(72) Inventors: Shawn Frayne, Tampa, FL (US); Shiu Pong Lee, Quarry Bay (HK); Tung Yiu Fok, Sha Tin (HK); Alexis Hornstein, Raleigh, NC (US); Albert Hwang, New York, NY (US); Kyle Appelgate, Chester, NJ (US)

(73) Assignee: Looking Glass Factory, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/863,450

(22) Filed: Jan. 5, 2018

(65) Prior Publication Data

US 2018/0188550 A1    Jul. 5, 2018

Related U.S. Application Data

(63) Continuation of application No. 15/863,399, filed on Jan. 5, 2018.
(Continued)

(51) Int. Cl.
*G03B 21/28*    (2006.01)
*G03B 21/606*    (2014.01)
(Continued)

(52) U.S. Cl.
CPC ....... *G02B 27/2292* (2013.01); *G02B 3/0056* (2013.01); *G02B 3/0062* (2013.01); *G02B 5/124* (2013.01); *G02B 5/136* (2013.01); *G02B 27/106* (2013.01); *G02B 27/26* (2013.01); *G02B 27/283* (2013.01); *G03B 35/26* (2013.01); *H04N 13/225* (2018.05); *H04N 13/229* (2018.05); *H04N 13/305* (2018.05); *H04N 13/346* (2018.05); *H04N 13/383* (2018.05); *H04N 13/388* (2018.05); *G03B 21/28* (2013.01)

(58) Field of Classification Search
CPC ...... G03B 21/28; G03B 21/14; G03B 21/606; H04N 9/3141; H04N 13/0443; H04N 13/0402; G02B 27/2292; G02B 27/24
USPC .......................... 353/7, 8, 98, 99, 77, 78, 28
See application file for complete search history.

(56) References Cited

U.S. PATENT DOCUMENTS 6,377,402 B1 * 4/2002 Ma ..................... G02B 27/0172
                                                            359/631
7,938,540 B2    5/2011 Brentnall, III et al.
(Continued)

OTHER PUBLICATIONS

International Search Report and Written Opinion or PCT Application No. PCT/US18/12619 dated Apr. 5, 2018.

*Primary Examiner* — Ryan D Howard
(74) *Attorney, Agent, or Firm* — Jeffrey Schox

(57) ABSTRACT

A persistent image retroreflecting display that enables the formation of a real image in free space includes a first light source that generates a polarized light output; a retroreflector module adjacent a first side of the first light source; a quarter waveplate coupled to the retroreflector module and adjacent the first light source; and a reflective polarizer positioned between the first light source and a viewer of the display.

18 Claims, 29 Drawing Sheets

Related U.S. Application Data

(60) Provisional application No. 62/442,695, filed on Jan. 5, 2017, provisional application No. 62/470,710, filed on Mar. 13, 2017, provisional application No. 62/507,032, filed on May 16, 2017, provisional application No. 62/529,342, filed on Jul. 6, 2017.

(51) Int. Cl.

| | | |
|---|---|---|
| *G02B 27/22* | (2018.01) | |
| *G02B 27/10* | (2006.01) | |
| *G02B 3/00* | (2006.01) | |
| *G02B 27/26* | (2006.01) | |
| *H04N 13/305* | (2018.01) | |
| *H04N 13/346* | (2018.01) | |
| *H04N 13/383* | (2018.01) | |
| *H04N 13/388* | (2018.01) | |
| *G02B 5/124* | (2006.01) | |
| *G02B 5/136* | (2006.01) | |
| *G02B 27/28* | (2006.01) | |
| *G03B 35/26* | (2006.01) | |
| *H04N 13/229* | (2018.01) | |
| *H04N 13/225* | (2018.01) | |

(56) References Cited

U.S. PATENT DOCUMENTS

| | | |
|---|---|---|
| 8,657,453 B2 | 2/2014 | Maekawa et al. |
| 9,291,830 B2 | 3/2016 | Atkins |
| 2010/0014053 A1* | 1/2010 | Brentnall, III ..... G02B 27/2292 353/7 |
| 2010/0253917 A1 | 10/2010 | Gao et al. |
| 2012/0092766 A1 | 4/2012 | Maekawa et al. |
| 2012/0250151 A1 | 10/2012 | Lee et al. |
| 2013/0083291 A1 | 4/2013 | Smithwick et al. |
| 2013/0342814 A1 | 12/2013 | Atkins |
| 2018/0024373 A1* | 1/2018 | Joseph ............... G02B 27/2292 |

* cited by examiner view at first angle view at second angle

ADVANCED RETROREFLECTING AERIAL DISPLAYS

CROSS-REFERENCE TO RELATED APPLICATIONS

This application claims the benefit of the following: U.S. Provisional Application Ser. No. 62/442,695, filed on 5 Jan. 2017; U.S. Provisional Application Ser. No. 62/470,710, filed on 13 Mar. 2017; U.S. Provisional Application Ser. No. 62/507,032, filed on 16 May 2017; and U.S. Provisional Application Ser. No. 62/529,342, filed on 6 Jul. 2017; all of which are incorporated in their entireties by this reference.

TECHNICAL FIELD

This invention relates generally to the image display field, and more specifically to new and useful advanced retroreflecting displays.

BACKGROUND

Image displays are an integral part of modern life. From televisions to monitors to smartphone and tablet screens, image displays provide users with the ability to view and interact with information presented in a variety of forms.

The advent of three-dimensional displays has enabled users to experience images with higher realism than would be possible with their two-dimensional counterparts; however, the vast majority of 3D displays require the use of a head-mounted display (HMD) or other cumbersome peripheral.

Free-space 3D displays remove the need for an HMD, allowing multiple users to see and manipulate content in a shared experience. Unfortunately, the few existing free-space 3D displays are hampered by a number of issues, including size, limited view angle, low resolution and brightness, scene distortion, and high cost. Thus, there exists a need in the image display field to create new and useful advanced retroreflecting aerial displays. This invention provides such new and useful displays.

DESCRIPTION OF THE INVENTION EMBODIMENTS

The following description of the invention embodiments of the invention is not intended to limit the invention to these invention embodiments, but rather to enable any person skilled in the art to make and use this invention.

1. High-Resolution Retroreflecting Aerial Display

Figure 1:
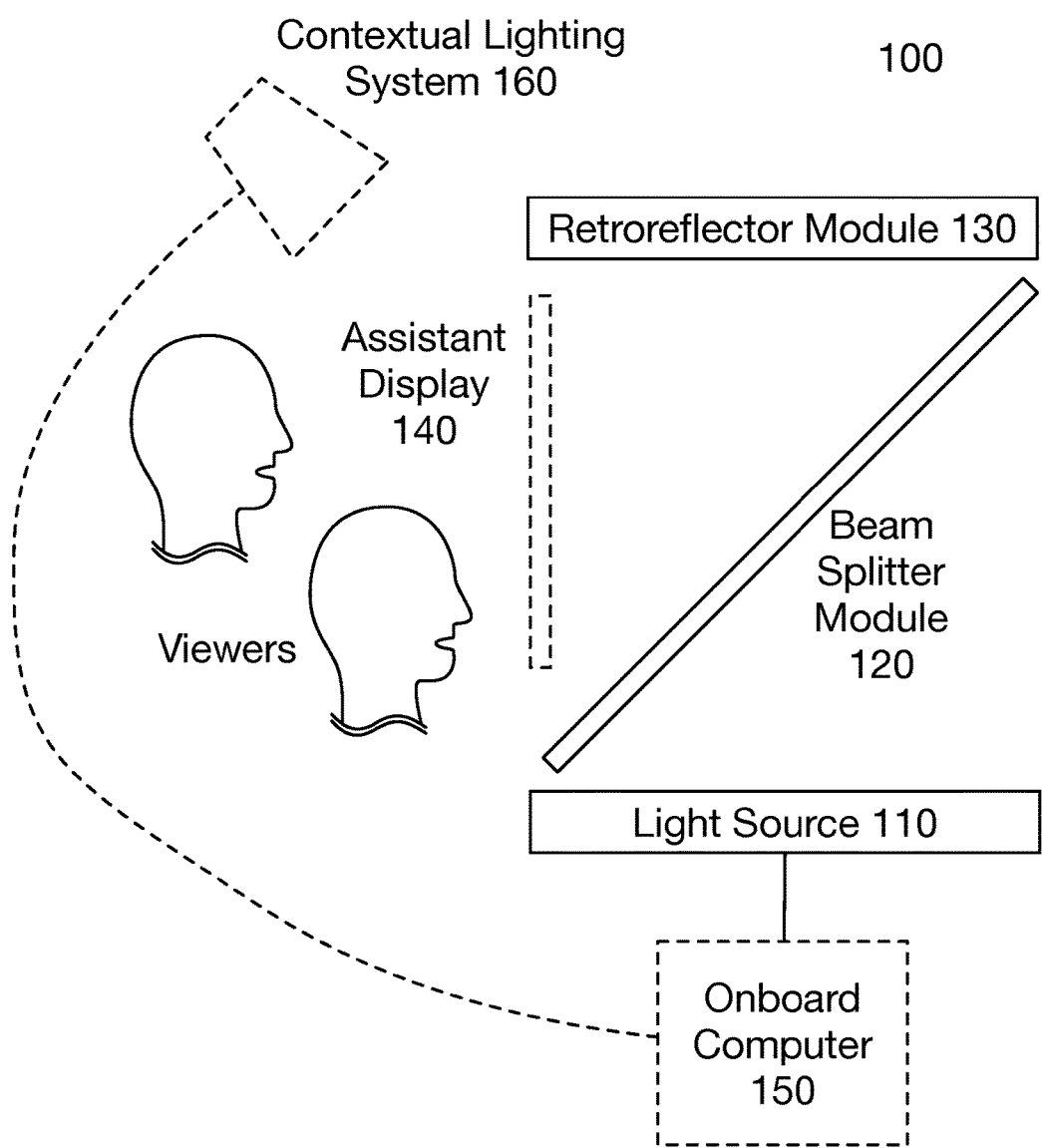
FIG. 1 is a diagram view of a system of a preferred embodiment.

A high resolution retroreflecting aerial display 100 includes a light source 110, a beam splitter module 120, and a retroreflector module 130, as shown in FIG. 1. The display 100 may additionally or alternatively include an assistant display 140, an onboard computer 150 and/or a contextual lighting system 160.

Figure 2:
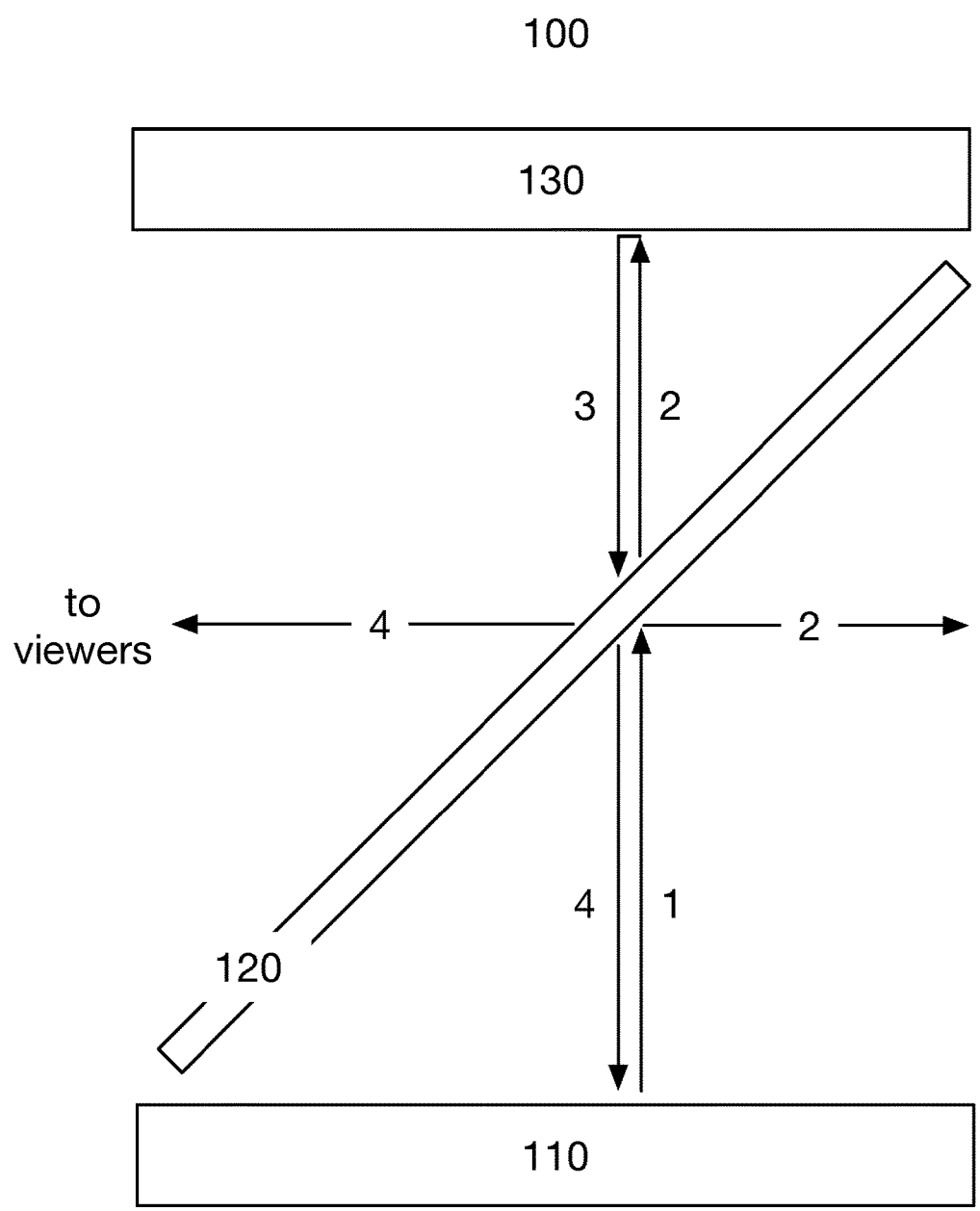
FIG. 2 is a diagram view of a first configuration of a system of a preferred embodiment.
Figure 3:
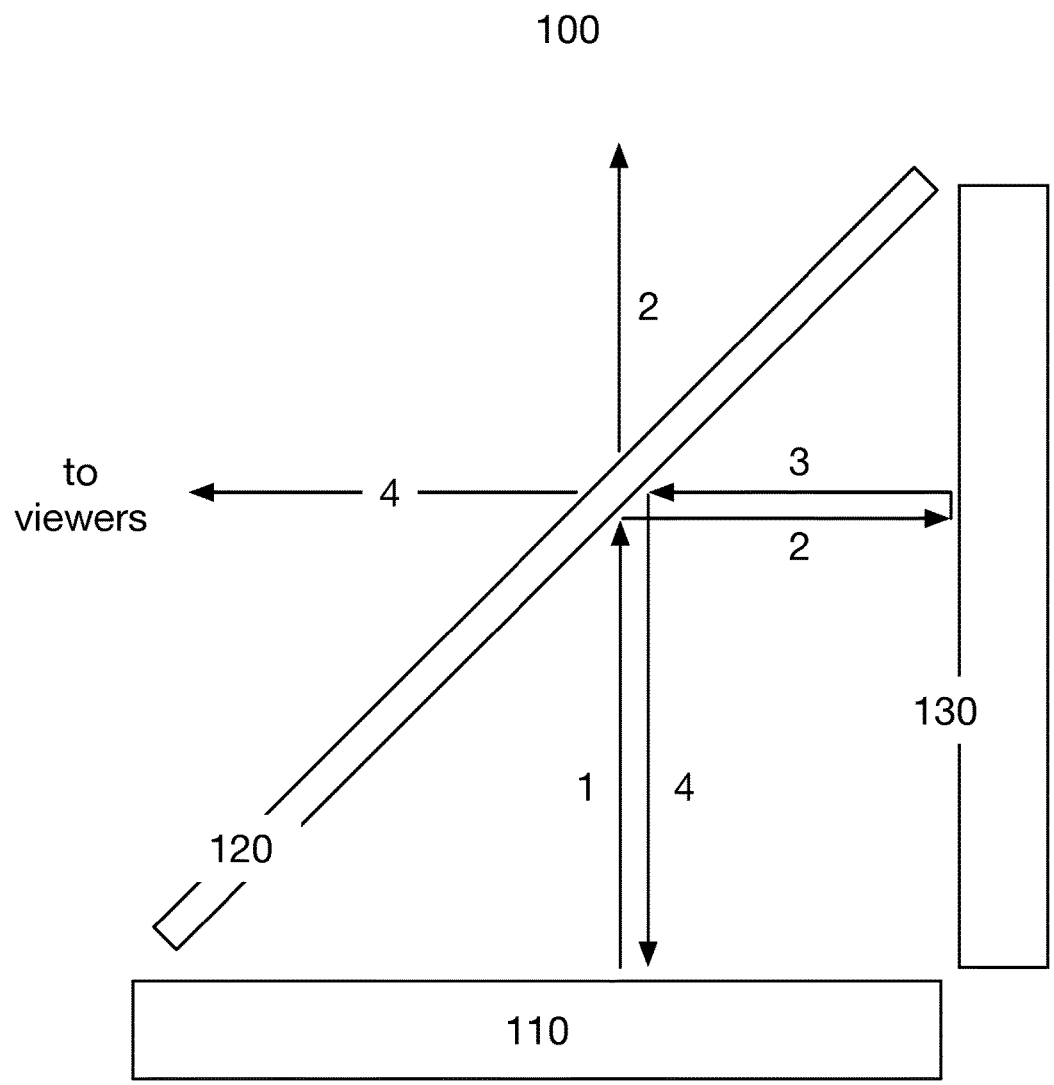
FIG. 3 is a diagram view of a second configuration of a system of a preferred embodiment.
Figure 4:
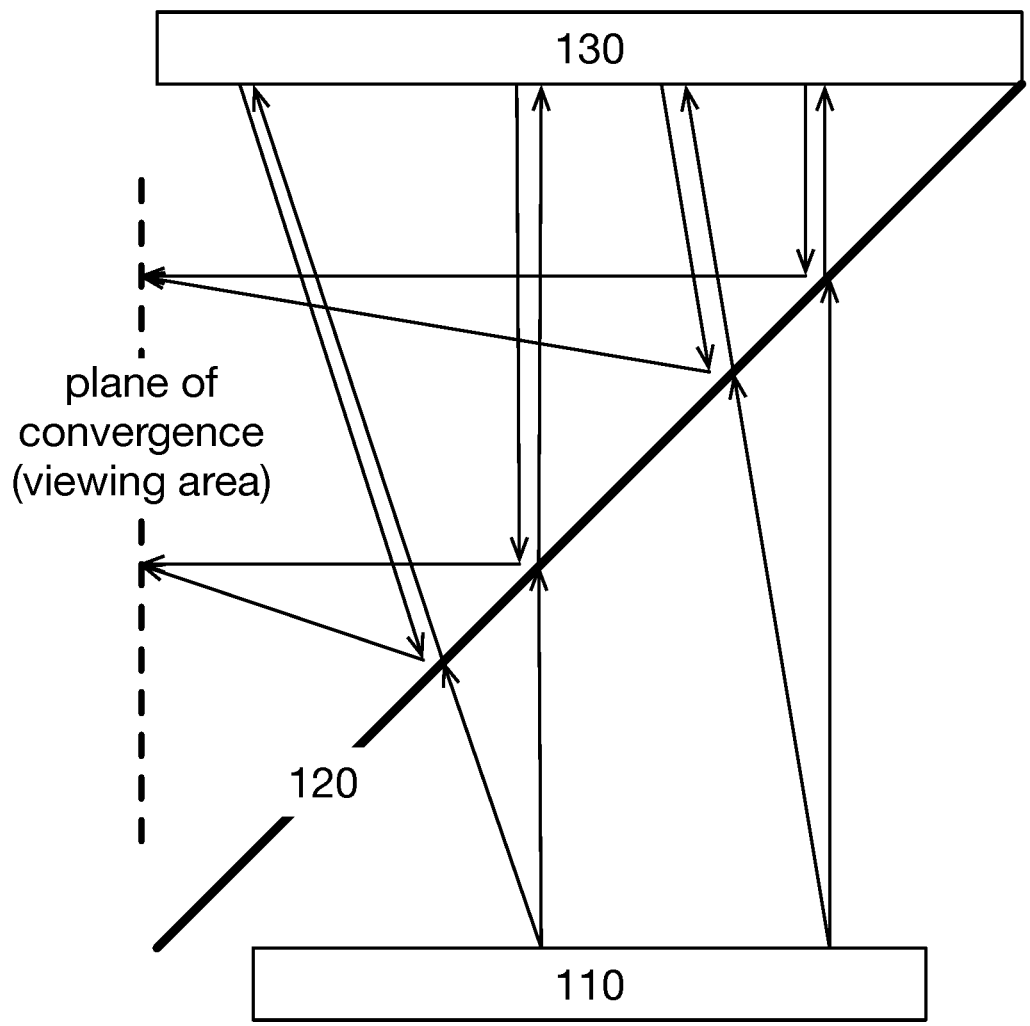
FIG. 4 is a diagram view of a system of a preferred embodiment illustrating the plane of convergence.
Figure 10:
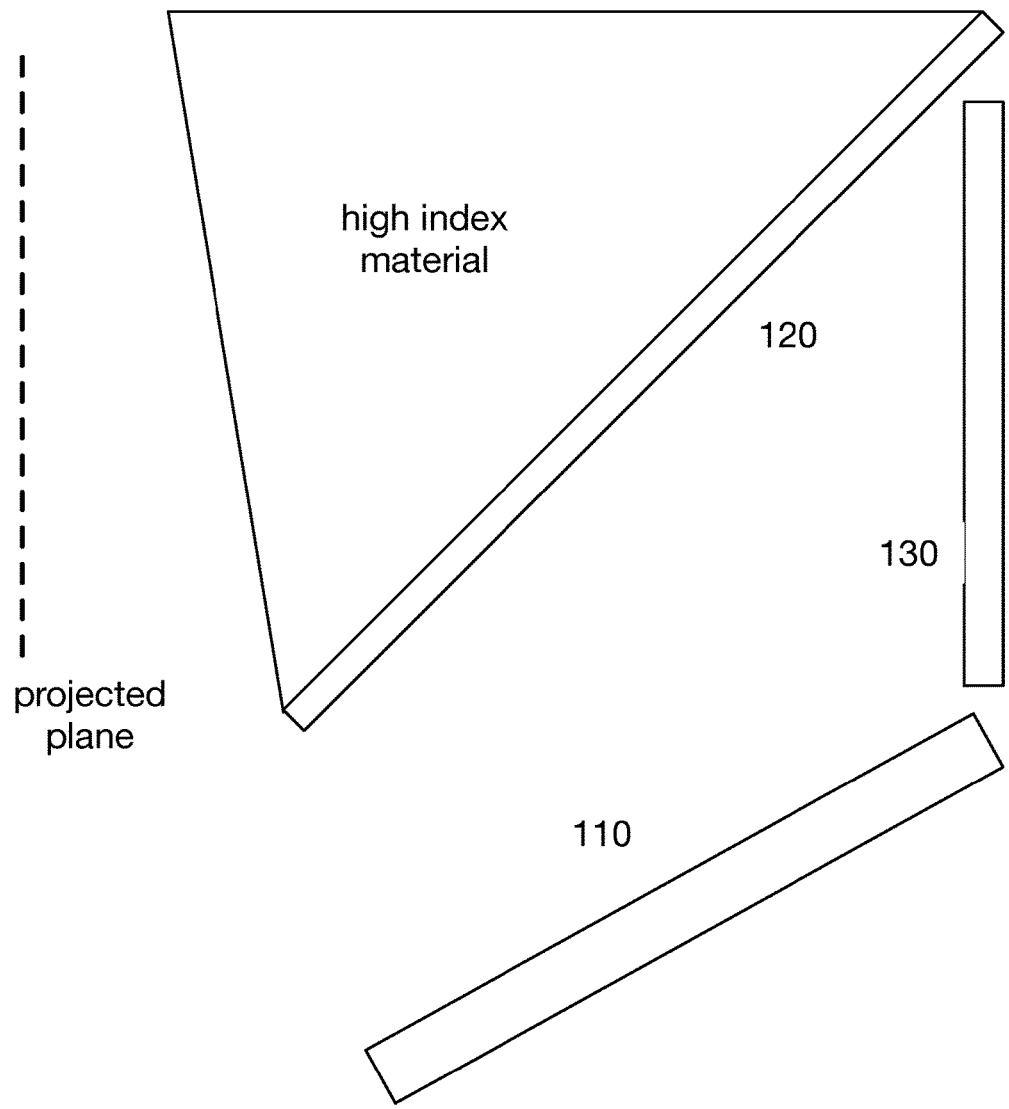
FIG. 10 is a diagram view of a system of a preferred embodiment having a high-index material in the display light path.

As shown in FIG. 2, the retroreflecting aerial display 100 functions to enable viewers to see two- and/or three-dimensional image data from multiple perspectives at the same time. The light source 110 preferably generates light (i.e., a light output) based on image data transmitted to or generated by the display 100. The output of the light source 110 is projected or otherwise transmitted to the beam splitter module 120; at the beam splitter module 120, the light is split into transmitted and reflected components. In a first configuration, as shown in FIG. 2, the transmitted light impinges upon the retroreflector module 130 and is reflected back to the beam splitter module 120, where it is again split into transmitted and reflected components; then, the reflected component is directed to the display area. In this configuration, the light source 110 is opposite the retroreflector module 130. In a second configuration, as shown in FIG. 3, the reflected light impinges upon the retroreflector module 130 and is reflected back to the beam splitter module 120, where it is again split into transmitted and reflected components; then, the transmitted component is directed to the display area. In this configuration, the retroreflector module 130 is preferably oriented at ninety degrees relative to the light source 110 (alternatively, the retroreflector module 130 may be oriented at any angle relative to the light source 110; e.g., as shown in FIG. 10). In either of these configurations, the retroreflector module 130 preferably enables the light emitted by the light source 110 to converge in the viewing area, as shown in FIG. 4. Note that, as shown in FIG. 4, convergence may be in free space; alternatively, convergence may be within any optical material (e.g., a lens or display volume).

If the display 100 includes an onboard computer 150, the onboard computer 150 may convert or aid in converting image data transmitted to the display 100 into an ideal format for projection by the light source 110. Additionally or alternatively, computers external to the system 100 may be used to perform part or all of image processing.

The light source 110 functions to generate images (i.e., light generated from image data) for display by the retroreflecting aerial display 100. The light source 110 is preferably a planar two-dimensional display comprising a set of individually addressable pixels, but may additionally or alternatively be any suitable display. For example, the light source 110 may comprise one or more movable light sources; e.g., a laser that may be scanned across a set of positions to simulate the appearance of multiple light sources (i.e., display multiplexing).

The light source 110 is preferably an RGB color light source (e.g., each pixel includes red, green, and blue sub-pixels) but may additionally or alternatively be a substantially monochromatic light source or any other light source (e.g., a white light source).

The light source 110 is preferably a projector or projector light engine (e.g., DLP, laser, LCoS, and/or LCD projector) but may additionally or alternatively be any suitable display (e.g., an LCD monitor/TV display, an OLED display, an e-ink display, an LED array, a spinning LED display, an e-ink display, an electroluminescent display, a neon display, etc.). In one variation of a preferred embodiment, the light source 110 includes a liquid crystal panel with a collimated backlight.

Figure 5:
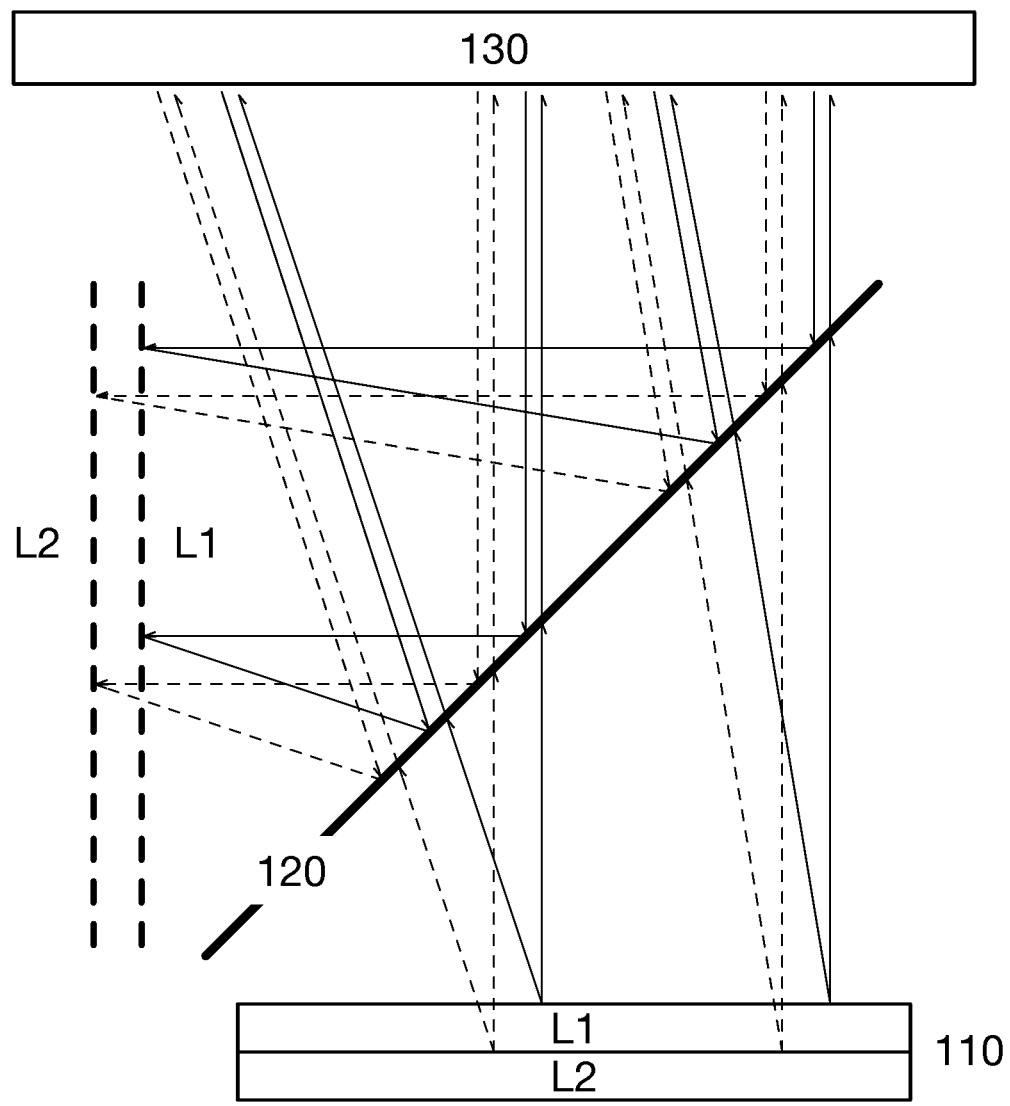
FIG. 5 is a diagram view of a system of a preferred embodiment illustrating multiple planes of convergence.

In another variation of a preferred embodiment, the light source 110 is a volumetric display; for example, the volumetric display of U.S. patent application Ser. No. 15/266,027, filed 15 Sep. 2016, the entirety of which is incorporated by this reference. Use of a volumetric display or other three-dimensional display as the light source 110 may enable the display 100 to display real-space 3D images; e.g., as shown in FIG. 5. In the example as shown in FIG. 5, a two-layer (L1, L2) volumetric display is used as the light source 110, resulting in a two-layer three-dimensional image. The light source 110 may be any type of volumetric display; e.g., oscillating volumetric displays, stacked LCD panels, and/or stacked transparent OLED panels, in addition to the light-folding volumetric display described above.

Figure 6A:
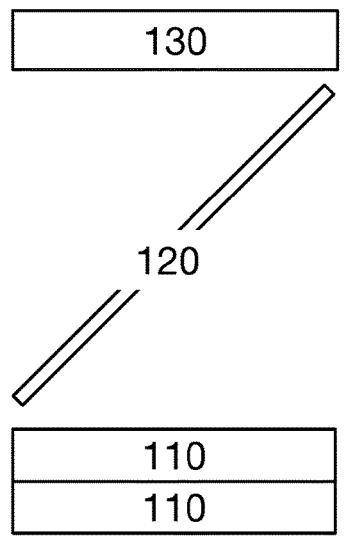
FIG. 6A is a diagram view of a system of a preferred embodiment with light sources in series.
Figure 6B:
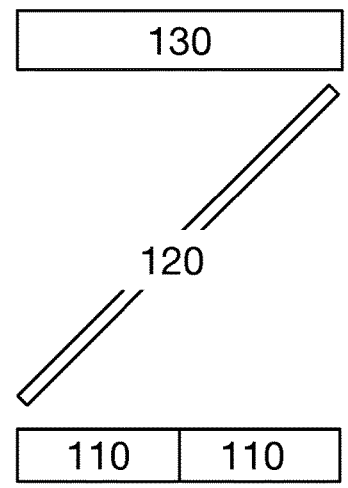
FIG. 6B is a diagram view of a system of a preferred embodiment with light sources in parallel.
Figure 6C:
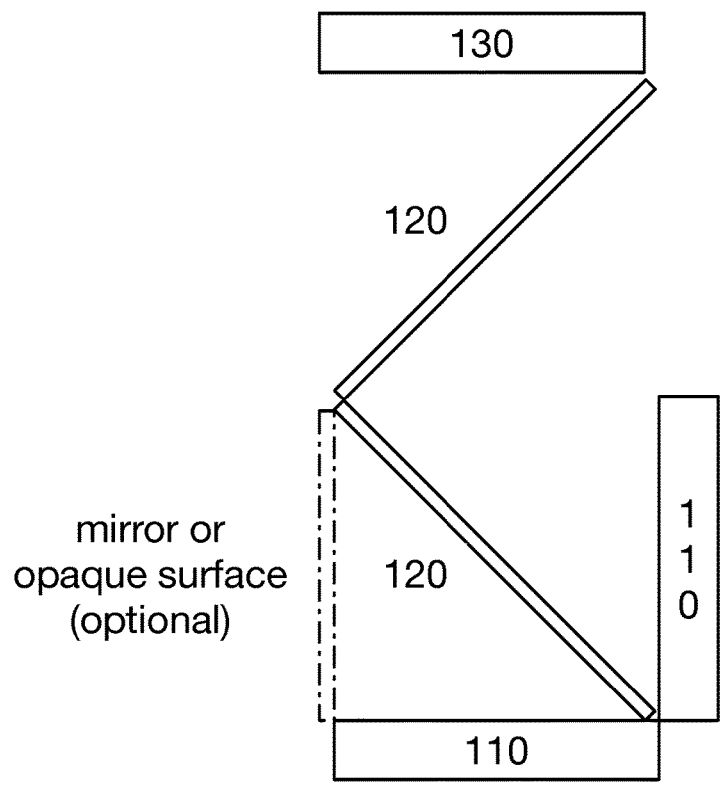
FIG. 6C is a diagram view of a system of a preferred embodiment with multiple light sources and beam splitter modules.

The retroreflecting aerial display 100 preferably includes a single light source 110, but may additionally or alternatively include multiple light sources 110. For example, multiple light sources 110 may be placed in series and/or in parallel as shown in FIG. 6A and FIG. 6B respectively. As another example, multiple light sources 110 may be used with multiple beam splitter modules 120, as shown in FIG. 6C. Note that any combination of light sources 110, beam splitter modules 120, retroreflector modules 130, and/or additional optics (e.g., mirrors, lenses, etc.) may be used in the retroreflecting aerial display 100. In configurations utilizing multiple light sources 110, the light sources 110 may be offset, angled, rotating, curved, or otherwise configured such that the image created by each light source is offset in depth (similar to with volumetric displays); e.g., as shown in FIG. 7.

Figure 7:
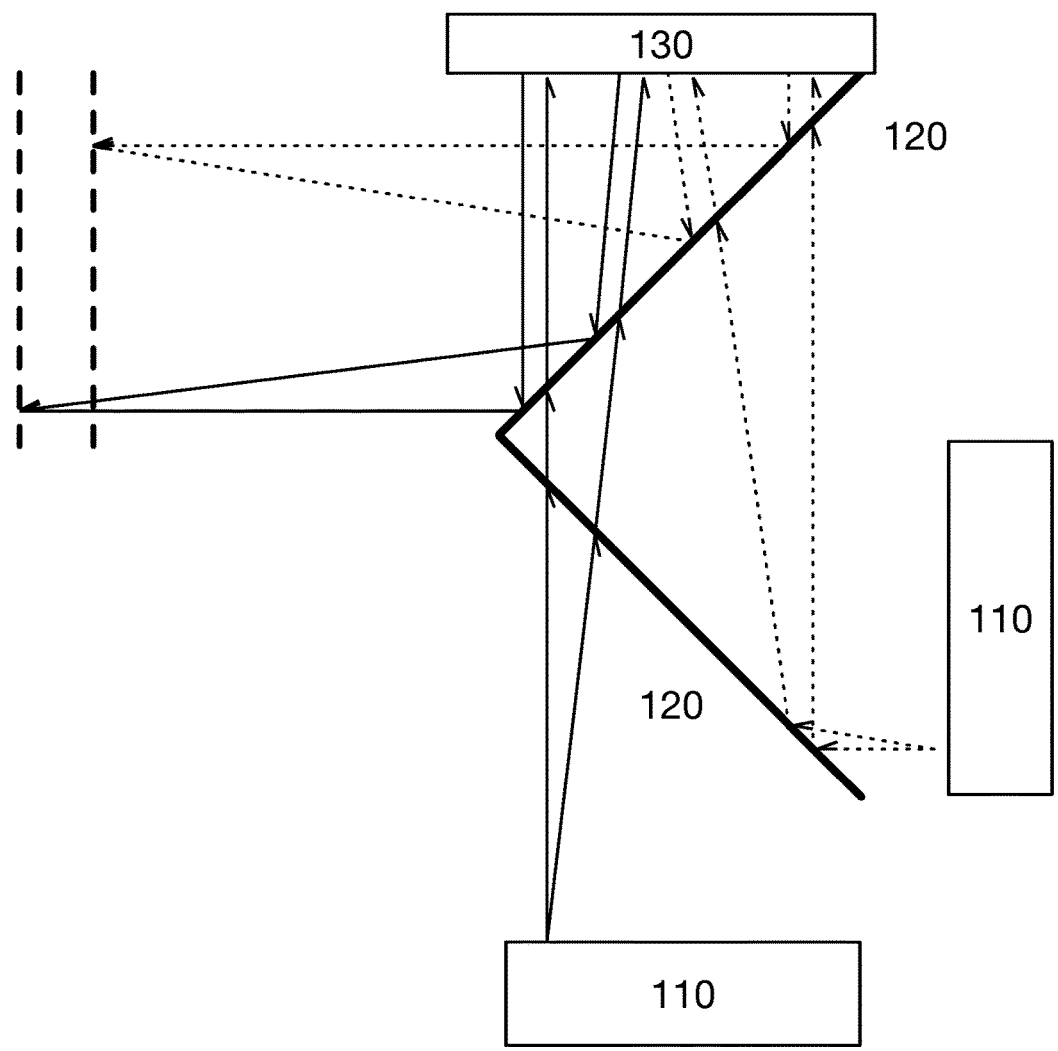
FIG. 7 is a diagram view of a system of a preferred embodiment illustrating correlation between light source placement and image position.

The example as shown in FIG. 7 shows that the position and orientation of the light source 110 may affect the position and orientation of the displayed aerial plane. While this effect may be harnessed in a static configuration, the display 100 may additionally or alternatively include mechanisms (e.g., motors, piezoelectronics, etc.) for moving one or more parts of the display 100 to change the position and/or orientation of the displayed aerial plane. In particular, the display 100 may be configured to rapidly modify this displayed aerial plane position, said modification synchronized with image data displayed by the light source 110 (e.g., by the onboard computer 150 or otherwise) to produce a 3D image. More specifically, the display 100 may display a first 2D image, corresponding to a first 'depth slice' of a 3D image, at a first aerial plane distance, and then a second 2D image, corresponding to a second 'depth slice' of a 3D image, at a second aerial plane distance (and so on, if there are more than two slices). This 3D multiplexing technique may be produced by using multiple light sources 110, by moving light sources 110, by moving beam splitter modules 120, by tuning optics of the display 100, or using any technique. For example, a moving two-dimensional display may display, at a first time and position, a first two-dimensional image, and, at a second time and position, a second two-dimensional image; the first and second positions separated by a non-zero distance; resulting in perception of a 3D image when the movement is fast enough (e.g., oscillation frequency of more than 30 Hz)

The light source 110 may include optical elements (e.g., lenses, mirrors, waveguides) that function to couple light into the beam splitter module 120 and/or the retroreflector module 130. For example, the light source 110 may include a mirror positioned at 45 degrees relative to the light source 110 output (resulting in a 90-degree redirection of light source output). As another example, the light source 110 may include a collimating lens designed to increase collimating of the light source 110 output. As a third example, the light source 110 may include a lens designed to scale (or otherwise distort) light source 110 output (e.g., reduce in size or increase in size). Such a lens may scale light source 110 output uniformly (e.g., 2× decrease in both image dimensions) or non-uniformly (e.g., no decrease in first image dimension, 4× decrease in other image dimension). As a fourth example, the light source 110 may include a lens that manipulates the focal plane of the viewed image; such a lens may be tunable (allowing depth of field to be swept).

If such a lens were tunable at a high rate, this may provide an expanded perceived depth of field to a viewer.

The light source 110 may additionally or alternatively include any passive or active optical elements to prepare light for use by the display 100 for any other purpose. For example, the light source 110 may include filters or splitters. As another example, the light source 110 may include microlens arrays and/or Fresnel lenses substantially similar to those of the retroreflector module 130 (see that section for more detail).

The beam splitter module 120 functions to direct light from the light source 110 to the retroreflector module 130 and to viewers of the display 100. The beam splitter module 120 preferably includes a half-silvered mirror beamsplitter, but may additionally or alternatively include any suitable type of beamsplitter (e.g., glass prism based, dichroic optical coating based, dichroic mirrored prism, etc.). The beam splitter module 120 preferably transmits and reflects equal power (50%), but may additionally or alternatively have any transmission/reflection coefficients. For polarizing beamsplitters (or in general), beamsplitting may be a function of light source polarization. Similar to the light source 110, the beam splitter module 120 may additionally or alternatively include any passive or active optical elements to prepare light for use by the display 100 for any other purpose. For example, the beam splitter module 120 may include lenses, polarizers, filters, and/or splitters. As another example, the beam splitter module 120 may include microlens arrays and/or Fresnel lenses substantially similar to those of the retroreflector module 130 (see that section for more detail).

Figure 8A:
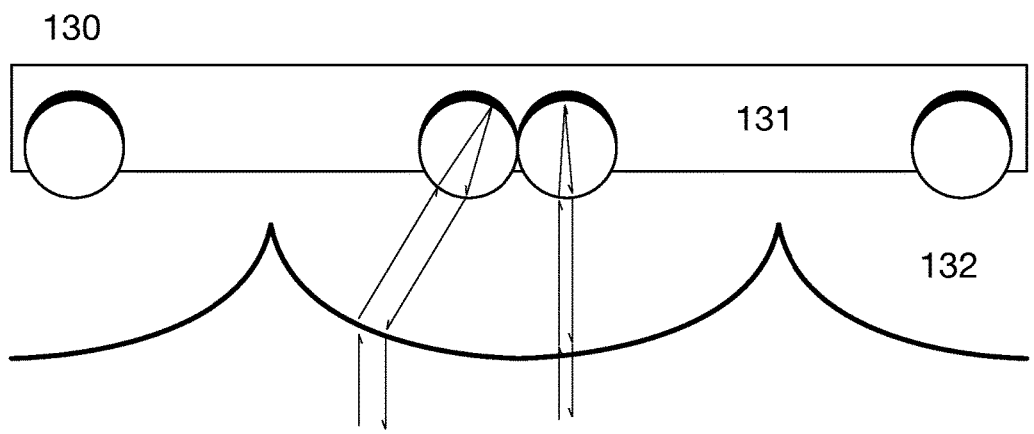
FIG. 8A is a diagram view of a retroreflector module of a system of a preferred embodiment.

As shown in FIG. 8A, the retroreflector module 130 includes one or more retroreflectors 131. The retroreflector module 130 may additionally or alternatively include microlens arrays 132 and/or Fresnel lenses 133. The retroreflector module 130 functions to reflect light (e.g., from the light source 110 or beam splitter module 120) impinging upon the retroreflector module 130 at an angle substantially similar to the angle of incidence, thus considerably reducing scattering compared to a planar mirror.

The retroreflectors 131 may be any type of retroreflectors, including cat's eye retroreflectors, corner retroreflectors, and/or phase-conjugate mirror retroreflectors.

Cat's eye retroreflectors may be any type of retroreflector including a refracting optical element and a reflective surface. Typical cat's eye retroreflectors are spherical; additionally or alternatively, cat's eye retroreflectors may include a normal lens focused onto a curved mirror. In one example implementation, the retroreflectors 131 are part of a microsphere or microprismatic retroreflective film. Such a film is preferably fabricated by microsphere deposition, but may additionally be fabricated using any additive (e.g. deposition, plating) or subtractive techniques (e.g., milling, etching), but may additionally or alternatively be fabricated by any suitable means.

Corner retroreflectors feature a set of three mutually perpendicular reflective surfaces; in some cases, corner retroreflectors may be formed by three flat mirrors bracketing an air space; in others, corner retroreflectors may be formed by the surfaces of a solid object (e.g., a glass cube). In one example implementation, the retroreflectors 131 are part of a dihedral corner reflecting array (DCRA). In this example implementation, the DCRA preferably comprises a two-dimensional array of dihedral corner reflecting elements positioned such that incident light is able to reflect twice inside the reflecting elements, resulting in the light traveling along a path plane-symmetric to incident path. The DCRA is preferably fabricated by milling, etching, or otherwise creating an array of square through holes in a highly reflective substrate or film (e.g., a metal), but may additionally or alternatively be fabricated by any suitable means.

The retroreflector module 130 is preferably aligned with the light source 110 and/or beam splitter module 120 such that the majority of light incident on the module 130 is accepted by the module 130 (that is, the angle of the light with respect to the retroreflectors 131 is such that the light contributes to the formation of a plane-symmetric real image). Additionally or alternatively, optics (e.g., lenses, mirrors, etc.) may be used in the light path in between the retroreflector module and the light source 110 and/or beam splitter module 120 to improve or otherwise modify acceptance of light incident on the retroreflector module 130.

In one implementation of a preferred embodiment, the retroreflector module 130 includes a microlens array 132, as shown in FIG. 8A. The microlens array 132 functions to focus light on the retroreflectors 131. While the use of the microlens array 132 may improve focusing ability, in some cases, the microlens array 132 may introduce visual artifacts that affect the focal locking of the viewers on the aerial imagery (e.g., if the lenses are not small enough). In such a case, the display 100 may include mechanisms (e.g., motors, piezoelectronics) for vibrating and/or rotating the microlens array 132 relative to the beam splitter module 120.

Figure 8B:
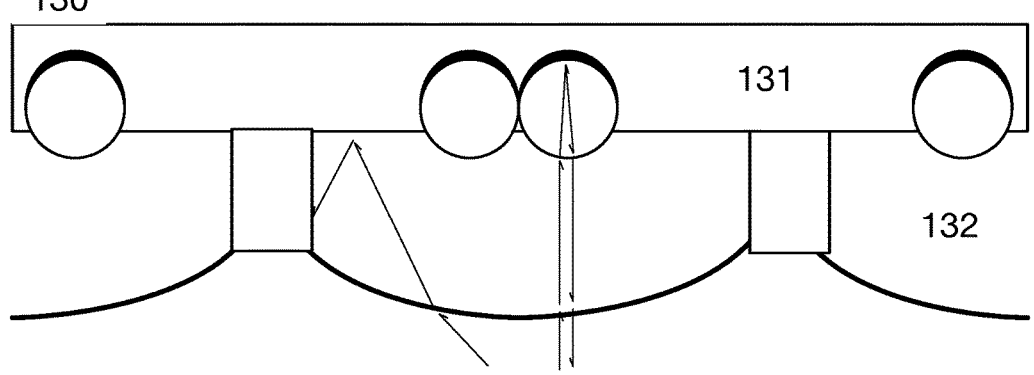
FIG. 8B is a diagram view of a retroreflector module of a system of a preferred embodiment.
Figure 8C:
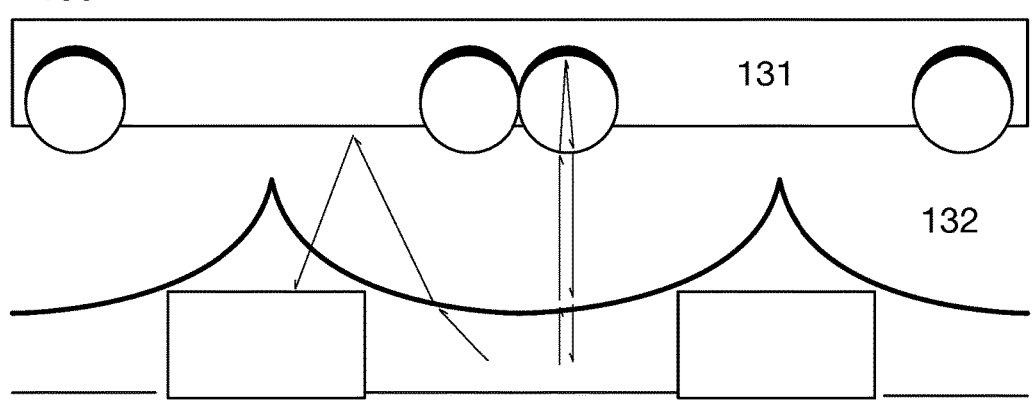
FIG. 8C is a diagram view of a retroreflector module of a system of a preferred embodiment.

In a variation of this implementation, the microlens array 132 may include structures (e.g., optical fibers, polarizing films, opaque segments, reflective planes etc.) that block errant reflections (e.g., those with angle substantially different than incident angle on the retroreflectors 131), as shown in FIG. 8B and FIG. 8C. As shown in FIG. 8B, these structures may be integrated with the microlens array 132 or may be independent as shown in FIG. 8C. These structures may be, for instance, perpendicular to the retroreflector module 130.

Figure 9:
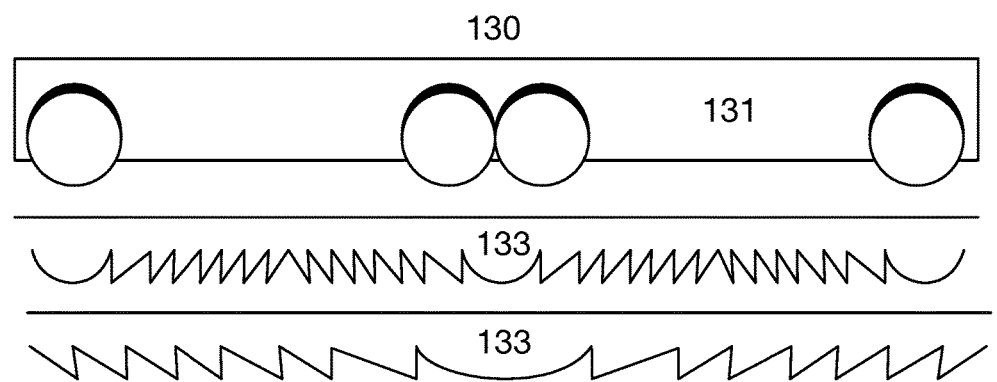
FIG. 9 is a diagram view of a retroreflector module of a system of a preferred embodiment.

The retroreflector module 130 may additionally or alternatively include one or more Fresnel lenses 133, as shown in FIG. 9, as a replacement and/or supplement for the microlens array 132. The use of Fresnel lenses (e.g., a Fresnel lens stack) may provide advantages over the microlens array 132 (e.g., less distortion).

The retroreflector module 130 may additionally or alternatively include any other optical elements (e.g., mirrors, lenses, waveguides, filters, polarizers) or other light-altering treatments (e.g., anti-glare surface treatments or layers, viewing angle restriction treatments or layers).

In one implementation of a preferred embodiment, a material with a refractive index greater than 1 is placed between the beam splitter module 120 and the viewer, as shown in FIG. 10. This serves to reduce the size of the display 100 without overly reducing the size of the projected image. The material is preferably a transparent glass or polymer, but may be of any opacity and/or any material. The material is preferably prism-shaped, but may additionally or alternatively be any shape or structure.

Figure 11:
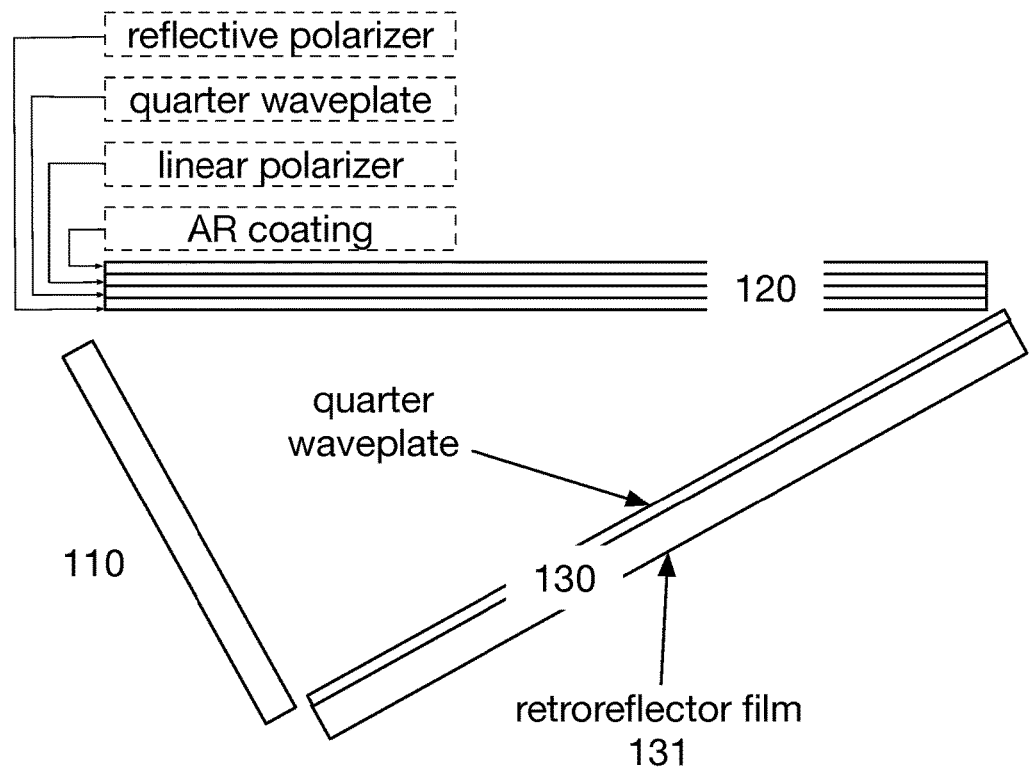
FIG. 11 is a diagram view of a system of a preferred embodiment.
Figure 12:
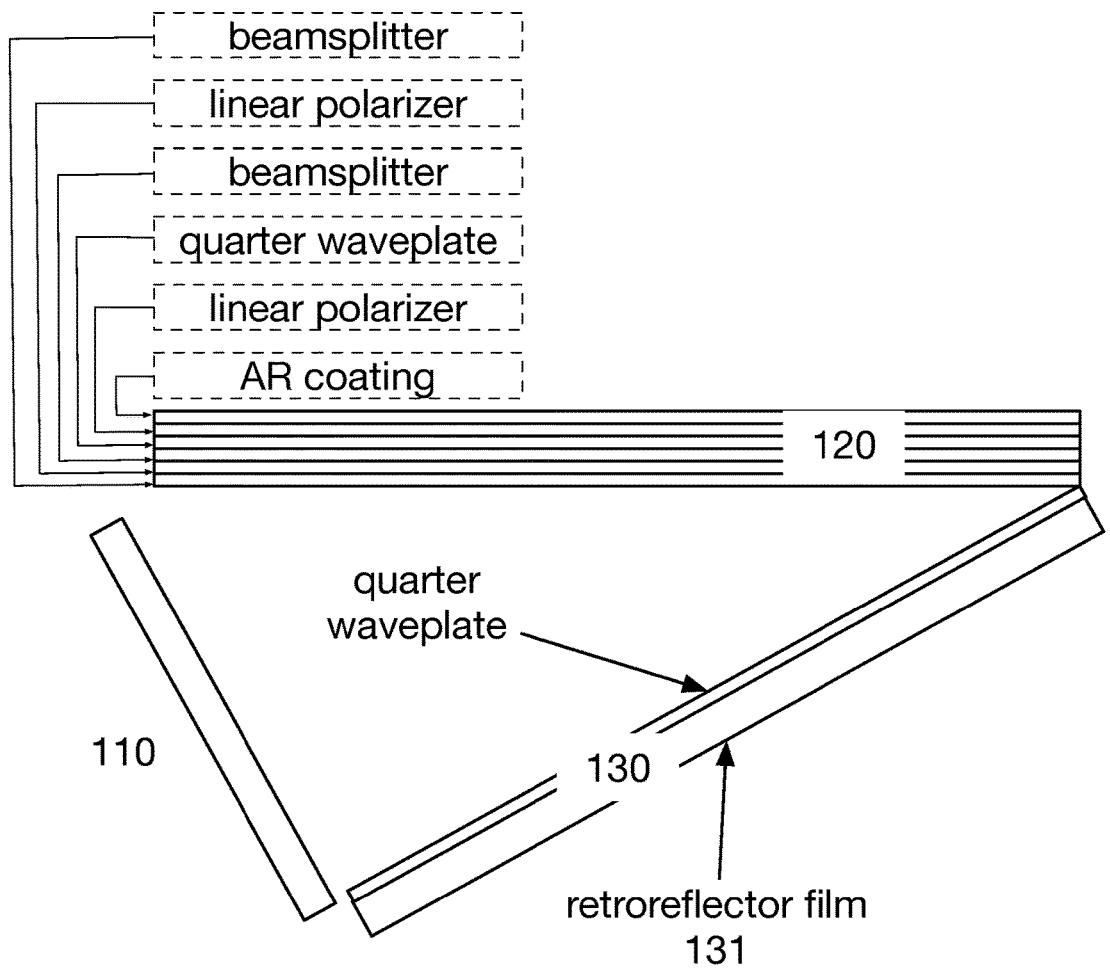
FIG. 12 is a diagram view of a system of a preferred embodiment.

In another implementation of a preferred embodiment, the display 100 may include optical elements that reduce glare/ambient light and/or increase viewing brightness of the display 100. For example, as shown in FIG. 11, the retroreflector module 130 may include a quarter waveplate; while the beam splitter module 120 may include a polarizing beam splitter stack (e.g., reflective polarizer, quarter waveplate, linear polarizer, and finally anti-reflective coating). As a second example, as shown in FIG. 12, the beam splitter module 120 may include a (standard, non-polarizing) beamsplitter, a linear polarizer, a second beamsplitter, a quarter waveplate, a linear polarizer, and finally anti-reflective coating. The display 100 may additionally or alternatively include any suitable optical elements to reduce glare, increase contrast, increase brightness, and/or in any other way modify the display 100.

Figure 13:
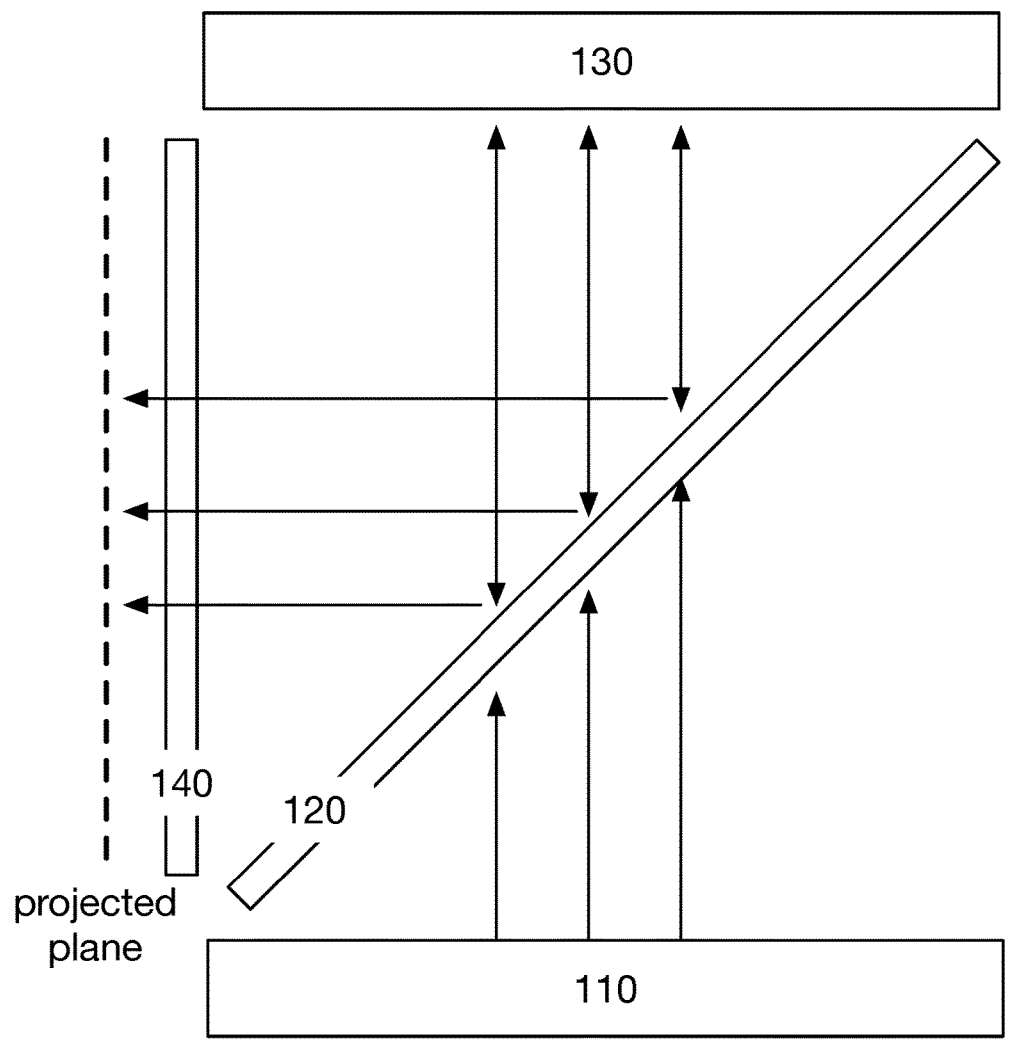
FIG. 13 is a diagram view of an assistant display of a system of a preferred embodiment.

The assistant display 140 functions to augment the display capabilities of the display 100 by providing a display (preferably transparent or semi-transparent) in or near the free-space image produced by the display 100. An example configuration of the display 100 featuring an assistant display 140 is as shown in FIG. 13.

The assistant display 140 is preferably transparent, semi-transparent or with tunable transparency, but may additionally or alternatively be of any opacity. The assistant display 140 is preferably a LCD or OLED panel, but may additionally or alternatively be any display as described in the section regarding the light source 110.

The display 100 (e.g., via the onboard computer 150) may strategically use the assistant display 140; for example, the assistant display 140 may be used to display text or labels relating to a 3D video, while the rest of the 3D video is projected into real space via the display 100.

Similar to the light source 110, the display 100 may include a plurality of assistant displays 140, arranged or configured in any manner.

The onboard computer 150 functions to perform image processing for image data received by the display 100 prior to display by the light source 110. For example, the onboard computer may separate 3D model information into slices to be projected by the light source 110. The onboard computer 150 may additionally or alternatively function to prepare 3D image data for voxel representation in any manner. For example, if light folding is performed by the display 100 (i.e., images are sliced and anisotropically scaled), the onboard computer 150 may perform interpolation between pixel values to determine a new transformed pixel value. As another example, the onboard computer 150 may perform dithering to simulate blurring at image edges. As a third example, the onboard computer may send control commands (e.g., activating piezoelectric movement of a beam splitter module 120).

If the display 100 includes a volumetric display, the onboard computer 150 may control image preparation for the volumetric display (as described in U.S. patent application Ser. No. 15/266,027).

The onboard computer 150 may additionally or alternatively function to control general properties of the light source 110, the beam splitter module 120, the retroreflector module 130, the assistant display 140, and/or the contextual lighting system 160; for example, the onboard computer 150 may control brightness of light source 110 pixels to simulate changes of opacity in a displayed image.

Note that the functions described as performed by the onboard computer 150 may additionally or alternatively be performed by any other computer system (e.g., a distributed computing system in the cloud).

In one implementation of an invention embodiment, the onboard computer 150 is communicative with another electronic device (e.g., a smartphone, a tablet, a laptop computer, a desktop computer, etc.) over a wired and/or wireless communication connection. In this implementation, data may be streamed or otherwise communicated between the onboard computer 150 and the other electronic device. For example, a smartphone may transmit video information to the onboard computer, where it is sliced into depth slices by the onboard computer 150. Additionally or alternatively, depth slicing may be performed by the other electronic device. In general, the task of image processing may be performed and/or split between any number of electronic devices communicative with the onboard computer 150.

The contextual lighting system 160 functions to light the periphery of the display 100 (or nearby area) with a light meant to match or resemble lighting conditions programmed into digital imagery displayed by the display 100. By doing so, the contextual lighting system 160 can 'lock' the imagery in the real world for some users; for example, a user's hand may be lit to match the lighting of a particular part of a digital scene near the user's hand. This may substantially increase immersiveness.

The contextual lighting system 160 may control lighting properties (e.g., color, duration, intensity, direction, degree of focus, collimation, etc.) based on explicit instructions in the digital imagery. Additionally or alternatively, the contextual lighting system 160 may control lighting properties in any manner. For example, the contextual lighting system 160 may (for digital images without explicit contextual lighting instructions) average the color across a subset of an image and light the display 100 with this light.

The contextual lighting system 160 may include any number and/or type of lighting devices; for example, color controllable LEDs.

The contextual lighting system 160 is preferably controlled by the onboard computer iso, but may additionally or alternatively be controlled by any controller or computer system.

The display 100 may also include means for interaction tracking. For example, the display 100 may include a depth camera that tracks user interaction with the display 100, allowing control and/or manipulation of the image displayed based on hand gestures and/or other interaction between a viewer and the display 100 as measured by the depth camera. As another example, the display 100 may include a transparent touch sensor that tracks viewer touch interactions on surfaces of the display 100.

In one implementation of a preferred embodiment, the display 100 includes an ultrasonic haptic feedback module and a head tracker (e.g., a camera or other device that tracks head position, orientation, and/or motion). In this implementation, tactile feedback via the haptic feedback module may be modified according to head tracking data (or other data, e.g., hand tracking data, body tracking data, video/audio capture data, etc.). Tactile feedback may also be provided by haptic gloves that are coordinated through the onboard computer 150 to provided tactile feedback that is coincident with the visual feedback of the system.

In another implementation of a preferred embodiment, the display 100 includes an infrared-opaque wand for interaction with aerial display (e.g., the wand is air gap or water containing, or of an IR blocking but visible-light transparent plastic or glass). This wand functions as an interaction instrument (in addition to a user's bare hands) that can be read by a depth camera, but which does not block the light of the aerial image like a visible-light interaction instrument or a hand would, in the case of interaction that extends past the plane of the aerial image. Additionally or alternatively, the wand may feature an infrared reflector and/or light emitter to better enable tracking.

Tracking and interaction are preferably controlled by the onboard computer 150, but may additionally or alternatively be controlled by any controller or computer system.

2. Flat Retroreflecting Aerial Display

Figure 14:
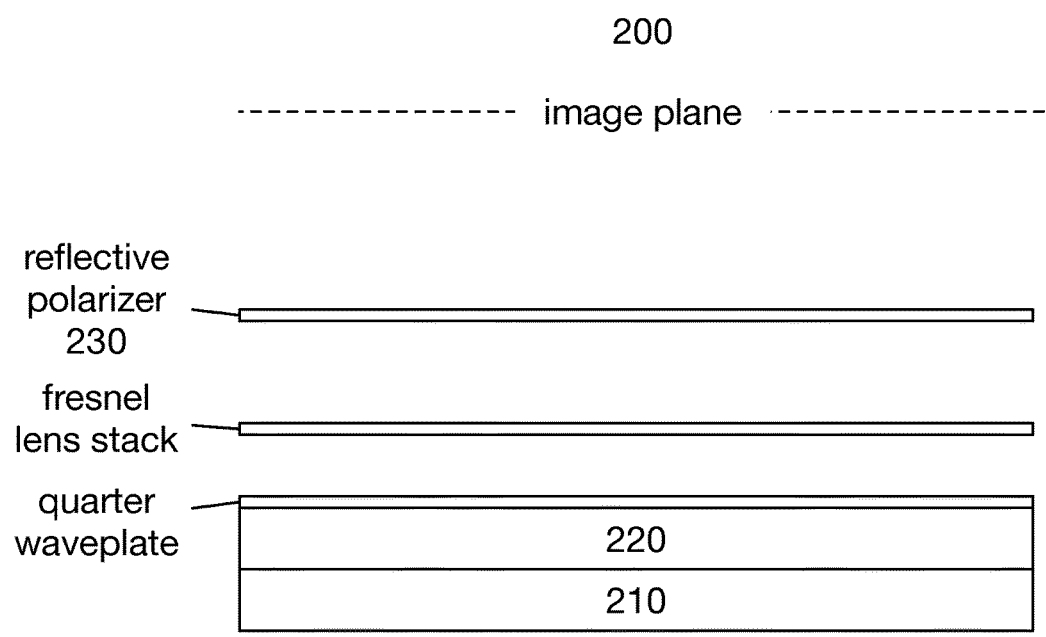
FIG. 14 is a diagram view of a system of a preferred embodiment.
Figure 15:
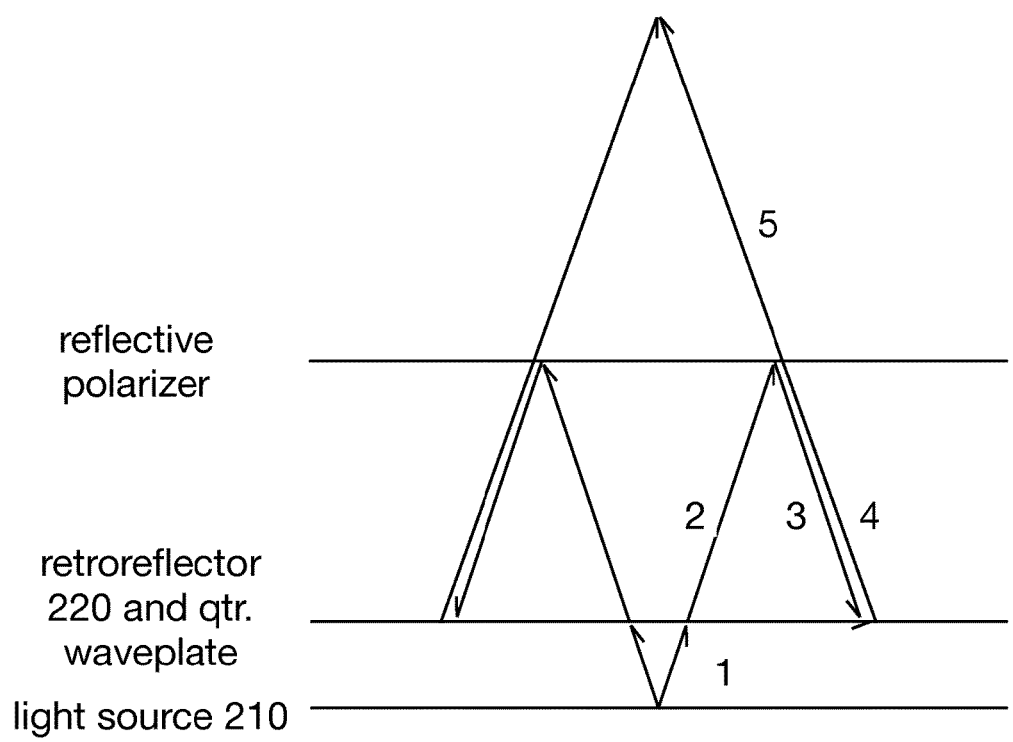
FIG. 15 is a diagram view of a system of a preferred embodiment.

A flat retroreflecting aerial display 200 includes a light source 210 and a retroreflector module 220, as shown in FIG. 14. The flat retroreflecting aerial display is a retroreflecting aerial display substantially similar to an embodiment of the display 100, with a retroreflector module 220 that is at least partially transparent or translucent. Accordingly, the light from the light source 210 (substantially similar to the light source 110, though preferably polarized) may pass through the back of the retroreflector module 220, then through a quarter waveplate, optional optics (e.g., a Fresnel lens stack or microlens array), before being reflected by a reflective polarizer 230 (similar to a beamsplitter module 120 oriented at a 0 degree angle to the light source; alternatively, a polarization filter if the light source 110 polarization and the reflective polarizer polarization are members of the same polarization basis set). After the reflection, the light again passes through the quarter waveplate, is retro-reflected, passes through the quarter waveplate again, and finally passes through the reflective polarizer, forming a real image in free space. This process is pictured in more detail as shown in FIG. 15. For example, if the light source 210 is linearly polarized (with polarization L1), the quarter waveplate may convert the light to a circular polarization (C1). The reflective polarizer (which reflects polarization C1 and transmits orthogonal circular polarization C2) reflects the C1 polarized light. As a result of the reflection, this light is incident upon the quarter waveplate again as C2 polarized light, so the quarter waveplate converts this to L2 linear polarized light (L2 being orthogonal to L1). After retroreflection, the light is again incident on the quarter waveplate, and is converted back from L2 polarized light to C2 polarized light. Finally, the light is incident on the reflective polarizer, which it now passes through, forming the real image in free space.

In a variation of an invention embodiment, the retroreflector module 220 is dynamically reconfigurable (e.g., electrically, mechanically, etc.). In this variation, reflection and/or transmission properties of the retroreflector module 220 are spatially configurable to modify the output image of the display 200.

The display 200 may additionally or alternatively include assistant displays, onboard computers and/or contextual lighting systems similar to those described for the display 100.

3. Dual-Perspective Flat Retroreflecting Aerial Display

Figure 16:
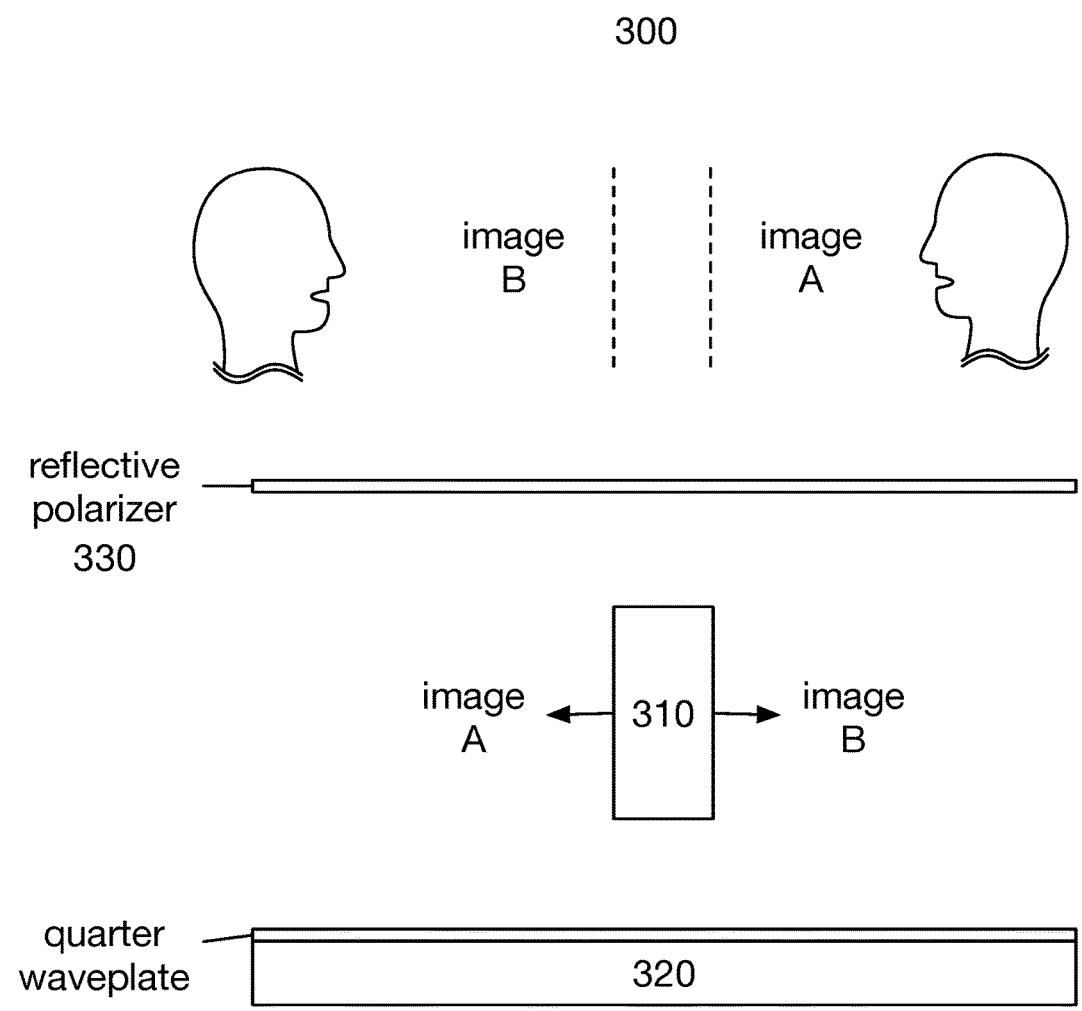
FIG. 16 is a diagram view of a system of a preferred embodiment.

A dual-perspective flat retroreflecting aerial display 300 includes a light source 310, a retroreflector module 320, and a reflective polarizer 330, as shown in FIG. 16. The dual-perspective flat retroreflecting aerial display is a retroreflecting aerial display substantially similar to the display 200, except that the retroreflector module 320 is not necessarily translucent/transparent, and the light source 310 is positioned in front of the retroreflector module 320, rather than behind it.

In the display 300, the light source 310 is preferably substantially similar to the light source 110, except that the light source 310 emits polarized (which is possible, but not necessary, for the light source 110). This can be accomplished either by an already polarized light source (e.g., an LCD) or the use of additional polarization filters.

Enabled by the display 300, each viewer on opposite sides of the display 300 can see a different image if the light source 110 projects two different images (such as the front of a person on one side of the device and the back of a person on the other side), as shown in in FIG. 16.

The quarter waveplate and reflective polarizer in the display 300 prevent the viewer from seeing the original screens under the reflective polarizer (which, given the polarized light source 110, serves as a beamsplitter), essentially only allowing the aerial image to be seen. This blocking function can also be accomplished to some extent with microlouver privacy filters on the light source 310 (or in any other manner).

Note that while the light source 310 is shown at a 90 degree angle to the retroreflector module 320 in FIG. 16, the angle between the light source and retroreflector module 320 may be any suitable angle(s).

The display 300 may additionally or alternatively include assistant displays, onboard computers and/or contextual lighting systems similar to those described for the display 100.

The display 300 may additionally or alternatively be constructed with a non-polarizing beamsplitter in place of the reflective polarizer 330, similar to the display 100 (in which case the light source 310 need not necessarily be polarized).

4. Thin Scattering-Retroreflecting Aerial Display

Figure 17A:
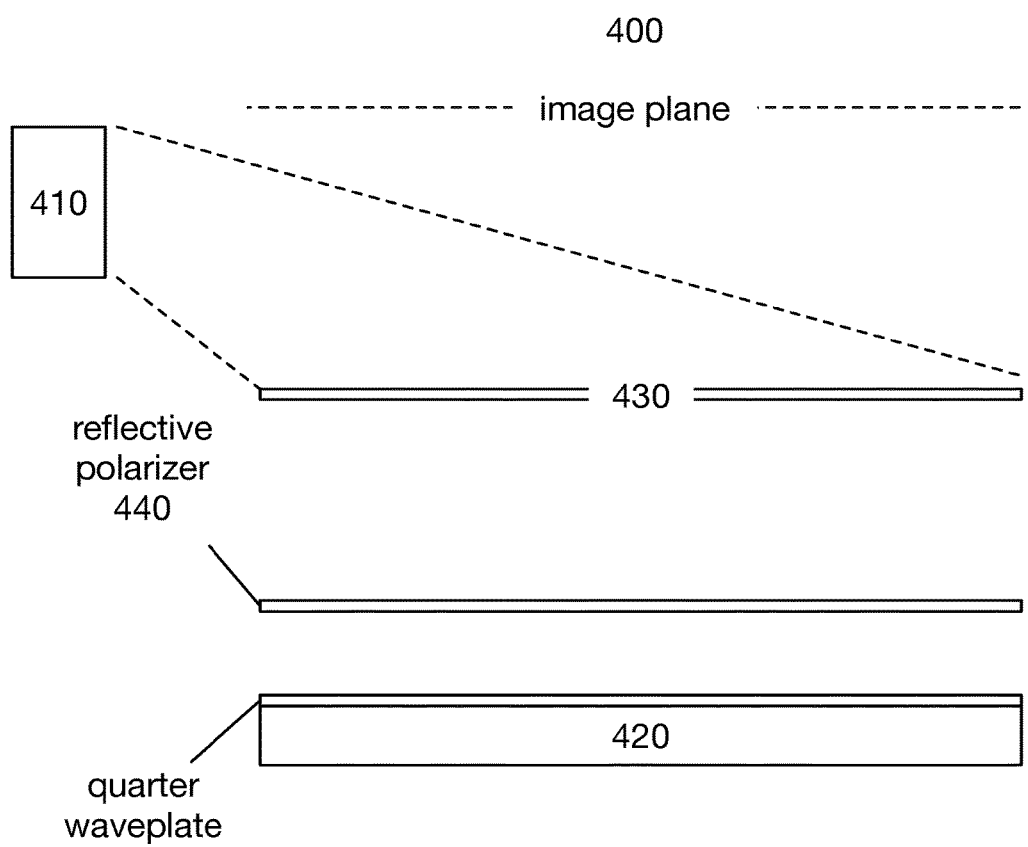
FIG. 17A is a diagram view of a system of a preferred embodiment.

A thin scattering-retroreflecting aerial display 400 includes a light source 410, a retroreflector module 420, a scattering module 430, and a reflective polarizer 440, as shown in FIG. 17A. The thin scattering-retroreflecting aerial display 400 is a retroreflecting aerial display substantially similar to a variation of the display 100 that utilizes a polarized light source 410 (similar to the light source 110); further, the reflective polarizer 440 in the display 400 ideally acts as a polarization filter rather than a beamsplitter (e.g., similar to the reflective polarizer of the flat retroreflecting aerial display 200). Finally, the thin scattering-retroreflecting aerial display 400 utilizes the scattering module 430 to reproject the output of the light source within the optical path of the retroreflector module 420 (similar to the retroreflector module 120) and reflective polarizer 440 to achieve an effect similar to that of the flat aerial display 200 without requiring a translucent or transparent retroreflector module 420. In this manner, the thin scattering-retroreflecting aerial display 400 is able to be thinner than traditional aerial displays—for example, the distance from the scattering module 430 to the retroreflector 420 may be approximately the same distance as the 'float distance' (the distance from the scattering module 430 to the image plane).

Figure 17B:
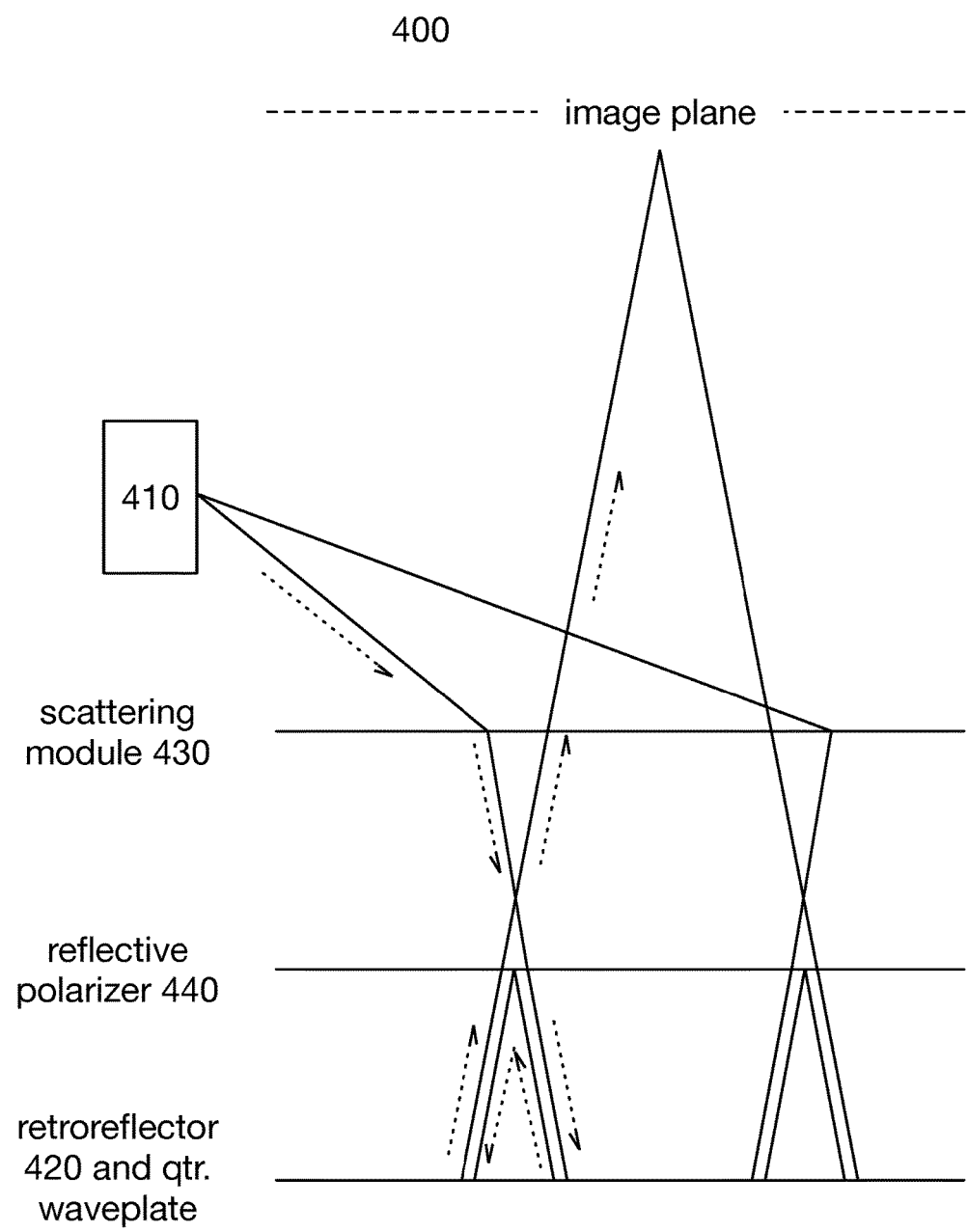
FIG. 17B is a diagram view of a system of a preferred embodiment illustrating light paths.

In the display 400, polarized light from the light source 410 (e.g., a short-throw projector) is incident upon the scattering module 430. The scattering module 430 preferably scatters the incident light perpendicular to the plane of the scattering module 430 (i.e., toward the reflective polarizer 440); alternatively the scattering module 430 may scatter light in any direction. After being scattered by the scattering module 430, the light incident on the reflective polarizer 440 is preferably transmitted by the polarizer 440 toward the quarter waveplate and retroreflector module 420. After passing through the quarter waveplate, being reflected by the retroreflector module 420, and again passing through the quarter waveplate, the light is rejected (i.e., reflected) by the reflective polarizer due to changed polarization, and passes through the quarter waveplate, is reflected by the retroreflector module 420, and passed again through the quarter waveplate. After this second pass, the light is transmitted by the reflective polarizer 440, passes through the scattering module 430, and forms a real image outside the scattering module 420. For example, as shown in FIG. 17B, if the light source 410 is linearly polarized (with polarization L1), the reflective polarizer 440 transmits the L1 light. In the first trip to the retroreflector module 420, the L1 light is converted by the quarter waveplate to a circular polarization (C1). After retroreflection, the light is reflected as C2 polarized light (orthogonal to C1). The quarter waveplate then converts the C2 polarized light to L2 light (orthogonal to L1), which is reflected by reflective polarizer 440. In the second trip to the retroreflector module 420, the light is converted from L2 to C2 to C1 to L1 by a process similar to that in the first pass (quarter waveplate to retroreflector to quarter waveplate). Finally, this light is transmitted by the reflective polarizer 440 and then by the scattering module 430. Note that successful implementation of this technique depends upon the scattering module 430 scattering the originally incident light more strongly than the twice-retroreflected light. The scattering module 430 is discussed in more detail in the following section.

The scattering module 430 functions to scatter light emitted by the light source 410 within the optical path of the retroreflector module 420. As previously described, the scattering module 430 preferably scatters originally incident light (input light) more strongly than light emerging from the reflective polarizer 440. The scattering module may comprise any material or structure with this result. For example, the scattering module 430 may comprise a translucent scattering foil that exhibits this property. As another example, the scattering module 430 may comprise metallic nanoparticles embedded in a transparent substrate. As a third example, the scattering module may comprise angled microlouvers.

The scattering module 430 may scatter light differently based on any light property. For example, the scattering module 430 may more strongly scatter light with higher intensity, or with larger angles of incidence (for the configurations as shown in FIGS. 17A and 17B, both of these would result in the intended effect). Alternatively, the scattering module 430 may scatter light dynamically based on any light property (e.g., angle of incidence, wavelength, power, polarization, etc.).

In a variation of an invention embodiment, a component of the display 400 exhibits dynamic polarization properties. For example, the light source 410 may dynamically change polarization, resulting in two image depths (a real image at the image plane when the polarizer 440 is aligned in polarization with the light, a virtual image behind the polarizer 440 when not aligned in polarization with the light). The scattering module 430 may dynamically alter light polarization for a similar effect.

In another variation of an invention embodiment, the scattering module 430 has dynamically configurable scattering properties. For example, the scattering module 430 may change from translucent (as shown in FIG. 17B) to opaque, also resulting in two image depths (again, the real image at the image plane when translucent, and a real image projected on the scattering module surface when opaque).

The display 400 may additionally or alternatively include assistant displays, onboard computers and/or contextual lighting systems similar to those described for the display 100.

The display 400 may additionally or alternatively be constructed with a non-polarizing beamsplitter in place of the reflective polarizer 440, similar to the display 100 (in which case the light source 410 need not necessarily be polarized).

5. Persistent Image Retroreflecting Aerial Display

Figure 18A:
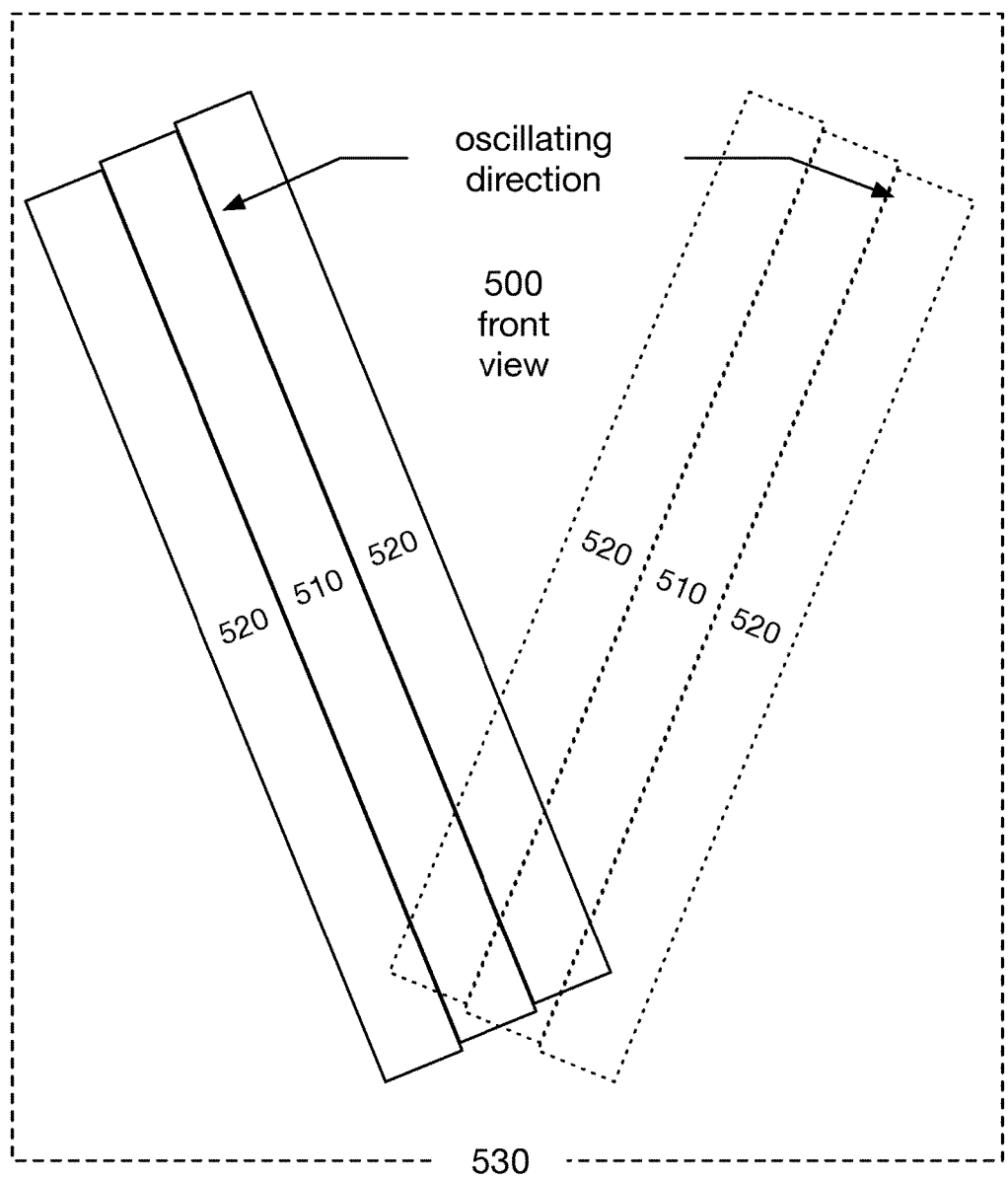
FIG. 18A is a front view of a system of a preferred embodiment.
Figure 18B:
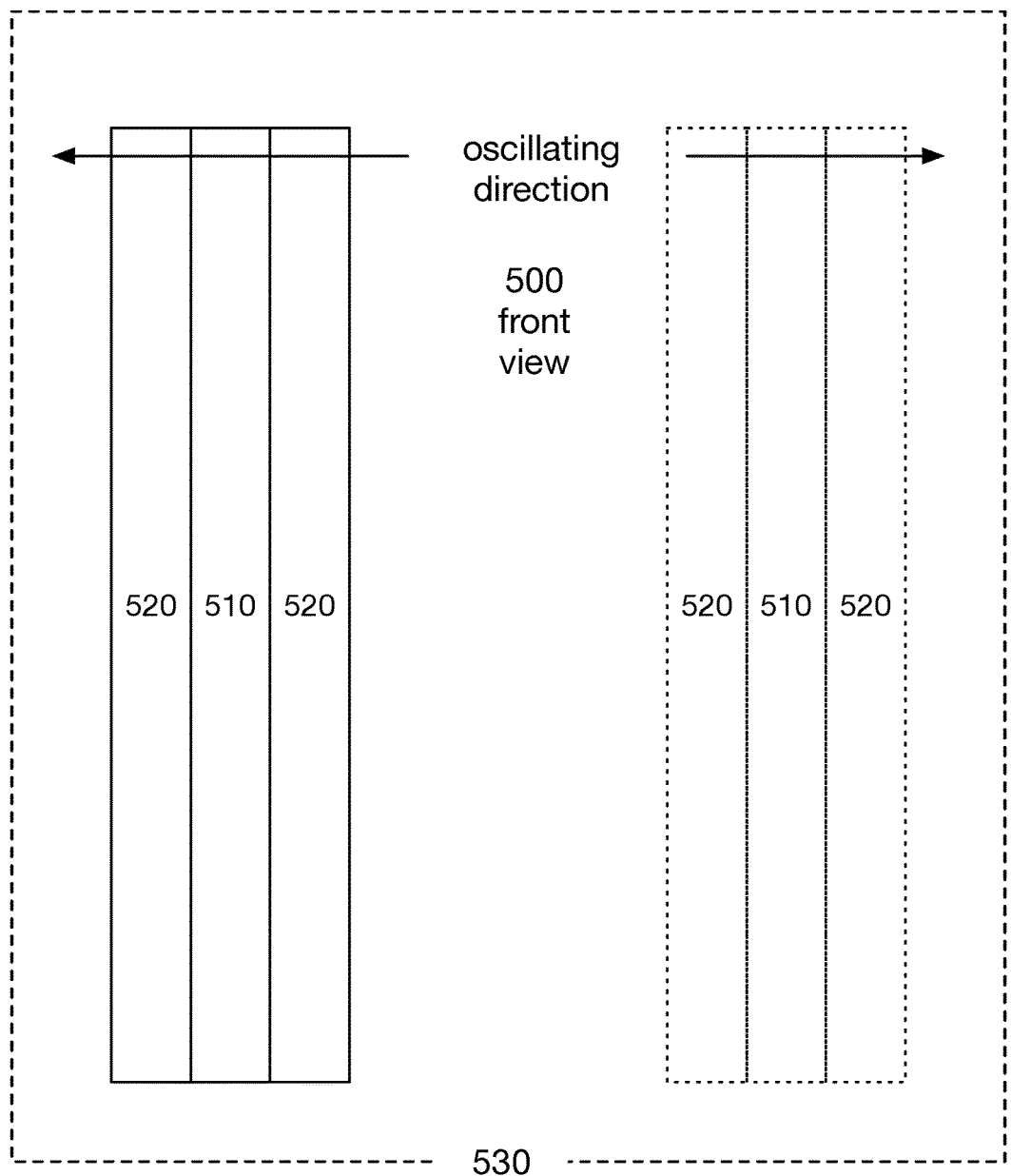
FIG. 18B is a front view of a system of a preferred embodiment.
Figure 18C:
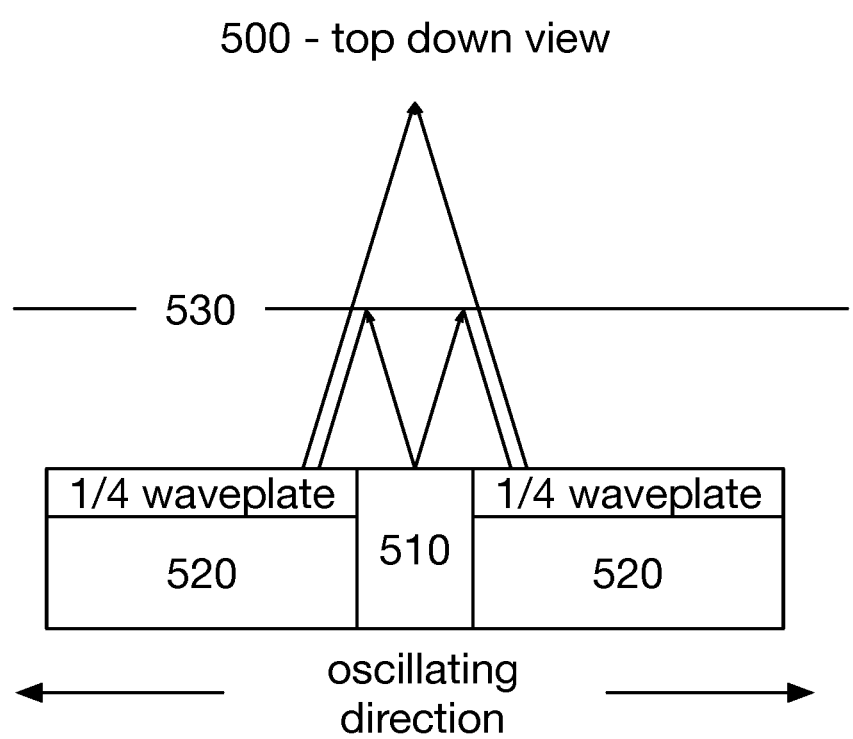
FIG. 18C is a top-down view of a system of a preferred embodiment illustrating light paths.
Figure 18D:
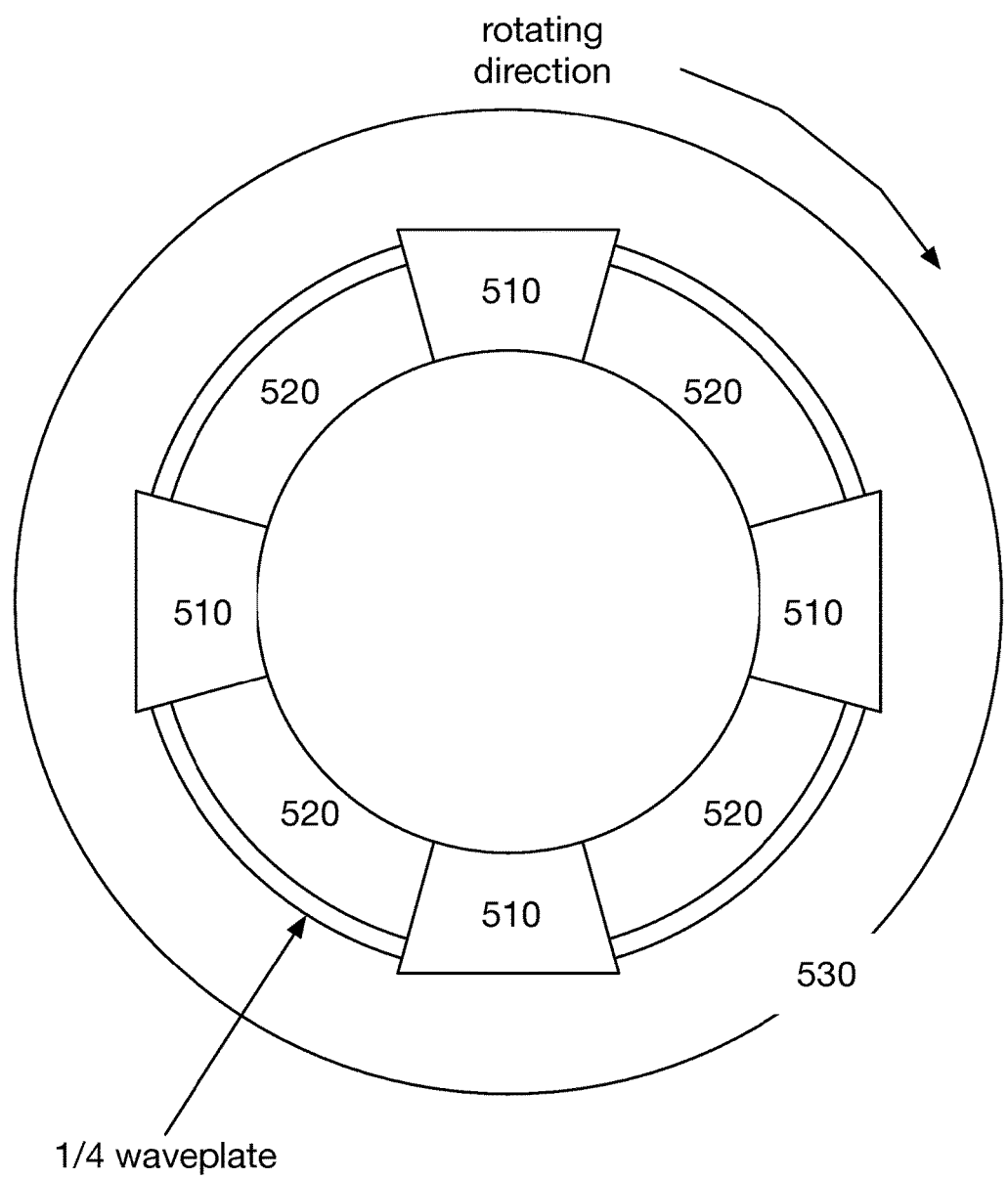
FIG. 18D is a top-down view of a system of a preferred embodiment illustrating light paths.

A persistent image retroreflecting aerial display 500 includes a moving light source 510 (similar to the light source 110), a retroreflector module 520 (similar to the retroreflector module 120) and a reflective polarizer 530, as shown in FIGS. 18A, 18B 18C, and 18D. In the display 500, the light source 510 forms an image by rotating or oscillating perpendicular to an optical axis of the light source 510. For example, the light source 510 may comprise a strip of LEDs (overlaid with a polarizing filter) that oscillates side to side, as shown in FIG. 18B or that performs rotary oscillation around one end (e.g., in a pendulum-like fashion), as shown in FIG. 18A. The LEDs are modulated as the light source 510 moves, creating an image viewable to humans due to image persistence. Alternatively, the light source 510 may comprise a cylinder with columns of LEDs that rotates (creating a similar effect), as shown in FIG. 18D.

In the display 500, the retroreflector module 520 preferably flanks or otherwise extends perpendicular to the direction of viewer at or near the light source, as shown in FIGS. 18C and 18D. Alternatively, the retroreflector module 520 may be positioned in any manner.

The display 500 creates an image in a manner similar to that of the display 200, except that propagation through the retroreflector module is not required (and thus the retroreflector module 520 need not be transparent or translucent). Accordingly, the light from the light source 510 (substantially similar to the light source 110, though preferably polarized) is initially reflected by the reflective polarizer 530, and then is transmitted via the quarter waveplate, reflected by the retroreflector module 520, transmitted again via the quarter waveplate, and finally transmitted through the reflective polarizer 530, forming an image in free space, as shown in FIG. 18C.

For example, if the light output of the light source 510 has a first linear polarization (L1), the light output may be reflected by the reflective polarizer 530 (which rejects L1 but passes orthogonal linear polarization L2), then pass through the quarter waveplate (which converts the light to a first circular polarization C1). Upon retroreflection, the C1 light is reflected as C2 light (orthogonal circular polarization to C1), which again passes through the quarter waveplate, converting the light to L2, which then passes through the reflective polarizer 530.

Note that other retroreflective displays of this disclosure may utilize reflective polarizers in a similar manner (as described for the display 200).

The display 500 may additionally or alternatively include assistant displays, onboard computers and/or contextual lighting systems similar to those described for the display 100.

Figure 18E:
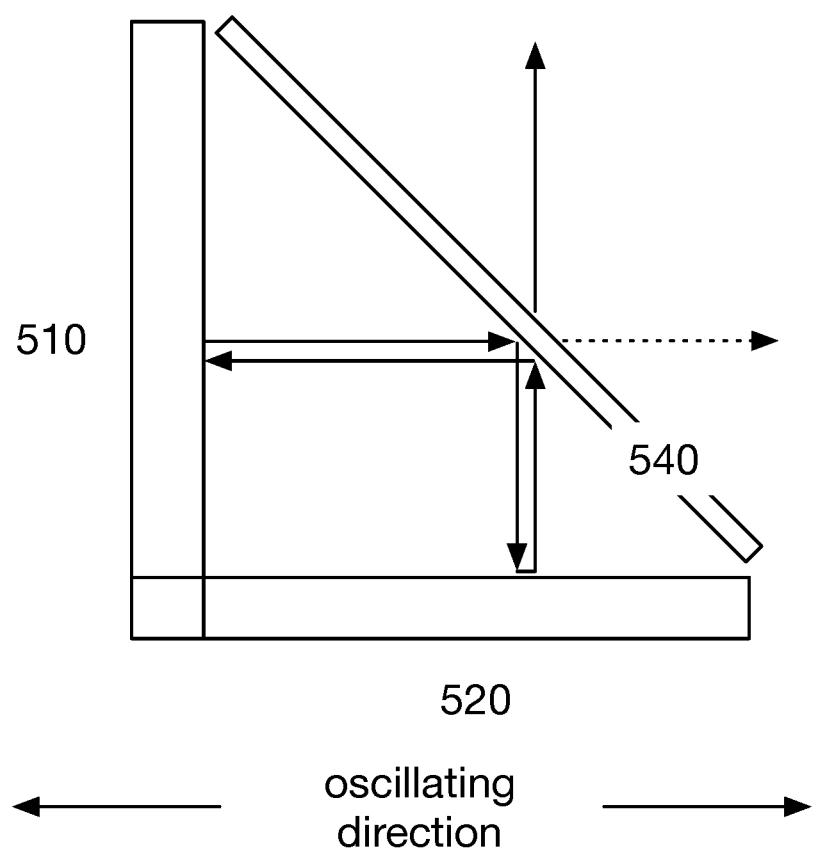
FIG. 18E is a top-down view of a system of a preferred embodiment illustrating light paths.

The display 500 may additionally or alternatively be constructed with a non-polarizing beamsplitter 540 in place of the reflective polarizer 530, substantially similar to beam splitting module 120 of the display 100 (in which case the light source 510 need not necessarily be polarized and a quarter waveplate may not be necessary). An example is as shown in FIG. 18E.

6. Superstereoscopic Image Retroreflecting Aerial Display

Figure 19:
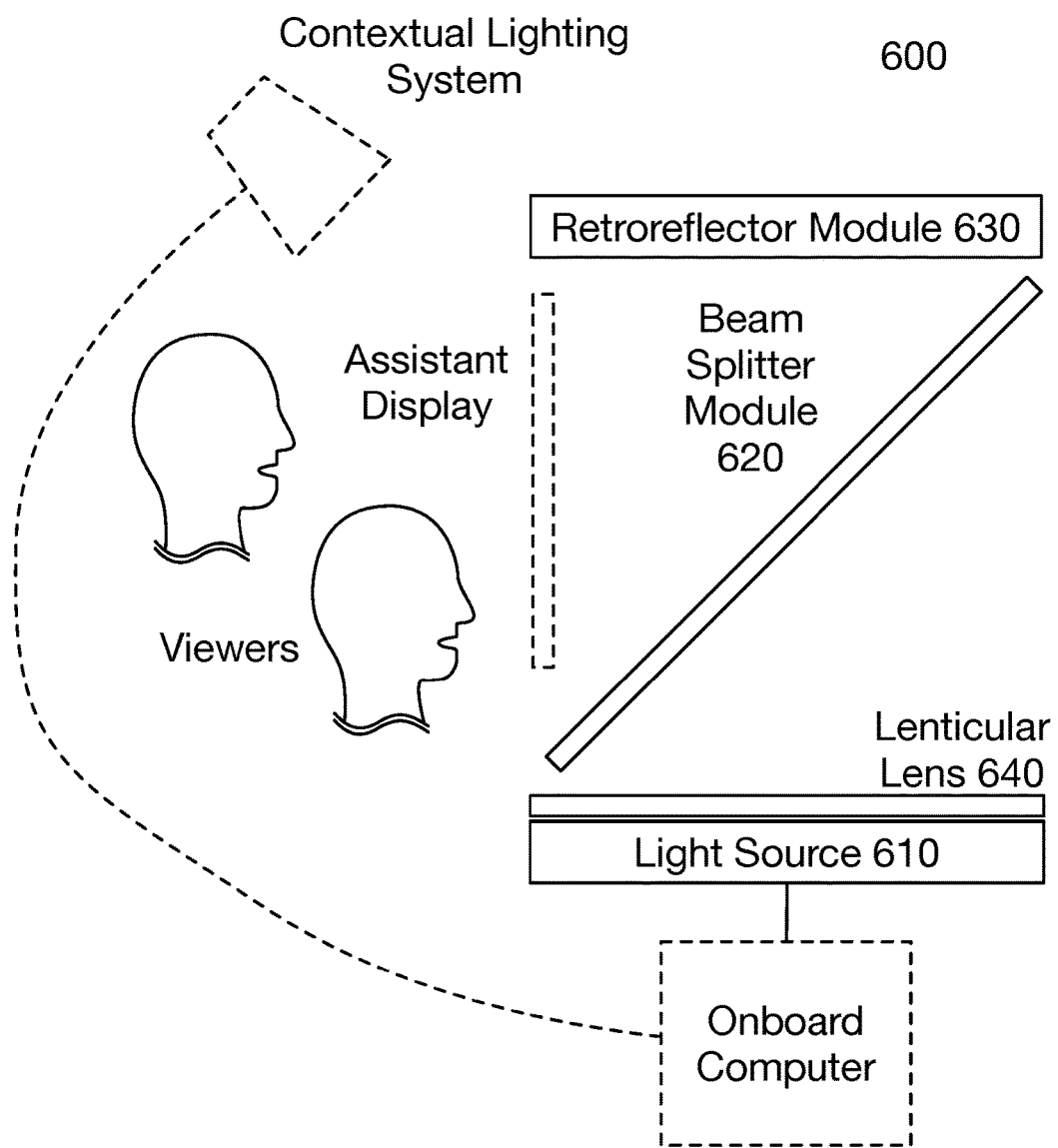
FIG. 19 is a diagram view of a system of a preferred embodiment.

A superstereoscopic image retroreflecting display 600 includes a light source 610, a beam splitter module 620, a retroreflector module 630, and a lenticular lens 640, as shown in FIG. 19.

The display 600 is preferably substantially similar to the display 100, with the addition of the lenticular lens 640. In combination with a suitably configured light source 610 (discussed in later sections), the lenticular lens 640 enables the display 600 to provide angle dependent real aerial images to viewers. This technique can be used to provide viewers with three-dimensional viewing capability of images on the display; additionally or alternatively, it can be used to provide viewers with different images based on viewing angle relative to the display 600.

Figure 20:
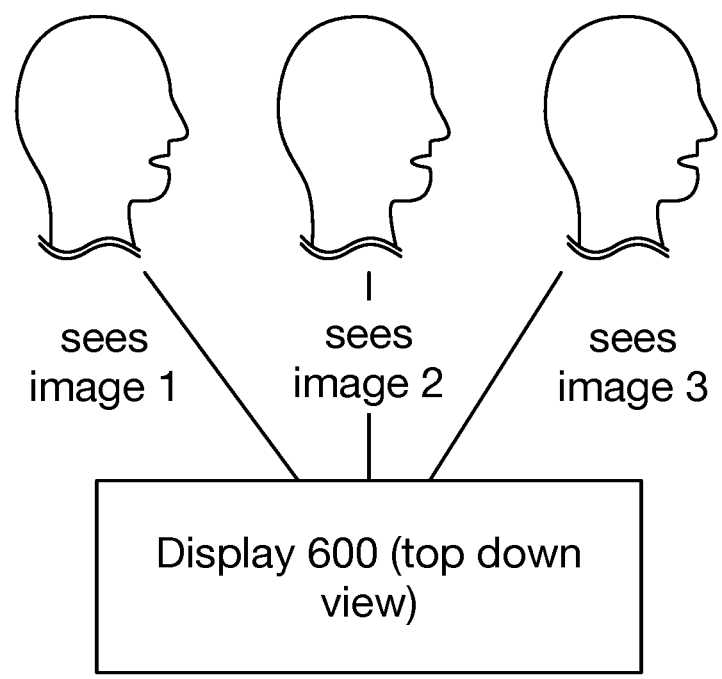
FIG. 20 is a diagram view of angle-dependent views produced by a system of a preferred embodiment.
Figure 21:
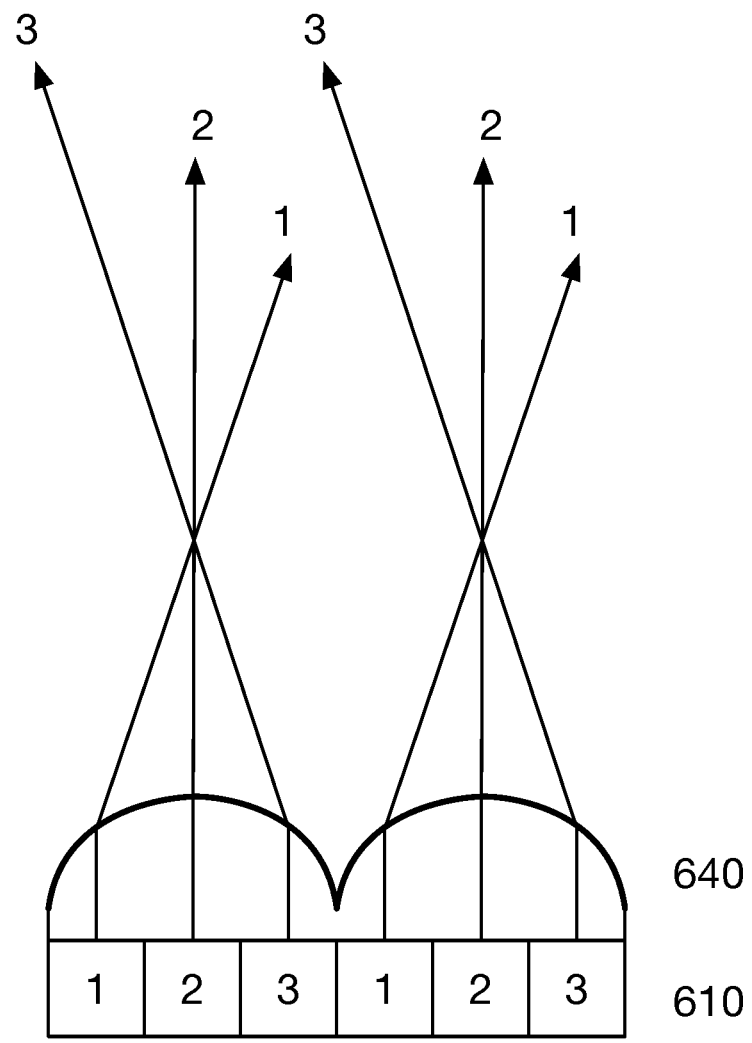
FIG. 21 is a diagram view of a light source and d lens of a system of a preferred embodiment.

For example, as shown in FIG. 20, the display 600 enables different images to be viewed at different angles. This effect is enabled by the combination of the lenticular lens 640 with a light source 610 that displays different pixels (or image segments) based on the positioning of the lenticular lens 640 over the light source 610. For example, as shown in FIG. 21, the image shown to viewers at three angles is comprised of the pixels labeled 1, 2, and 3, respectively.

Based on the properties of the lenticular lens 640 (e.g., pitch, material, structure, orientation and position relative to the light source 610) and desired viewing characteristics (e.g., number of viewers, view distance, number of views desired, viewing mode, etc.), the display 600 may modify the output of the light source 610 to produce a desired result.

Figure 22A:
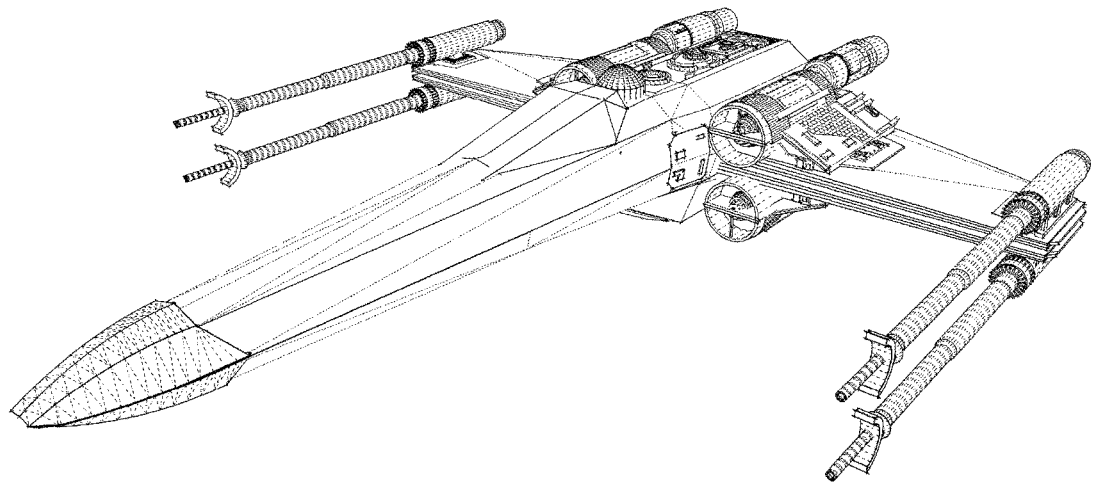
FIG. 22A is an example view of a first view of a three-dimensional image.
Figure 22B:
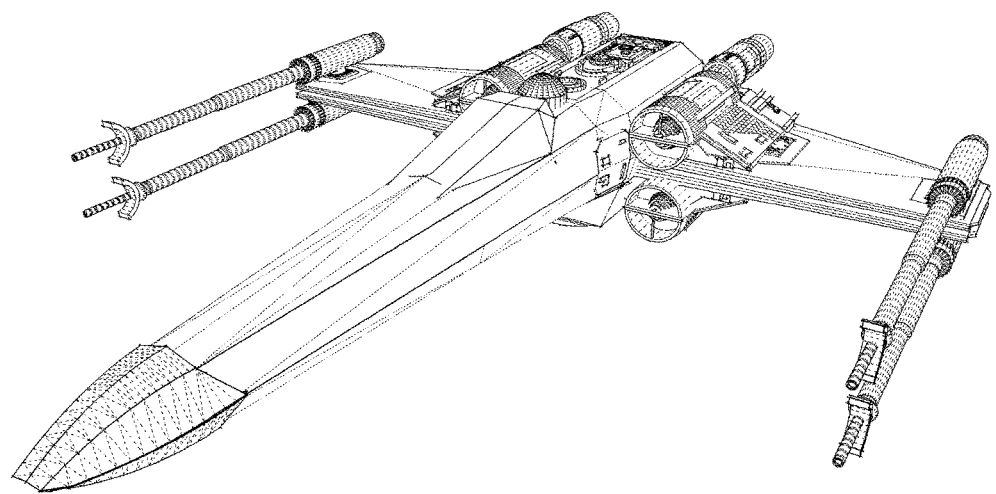
FIG. 22B is an example view of a second view of a three-dimensional image.

In one example embodiment, the number of different views provided by the display 600 is sufficient for superstereoscopic viewing at some viewing distance; that is, each eye of the viewer receives a different image from the display 600, and as the viewer moves around the display 600, the views change (with the viewing angle). For example, a viewer at angle one may see scene 1 with a right eye and scene 2 with a left eye, where scene 1 and scene 2 create a stereoscopic three-dimensional view of one or more objects. After the viewer moves from angle one to angle two, the viewer now sees scene 2 with the right eye and scene 3 with the left eye, producing a second stereoscopic three-dimensional view of the one or more objects. In this manner, the viewer perceives a three dimensional image (thanks to the stereoscopic effect) at a given viewing angle, and that perception is preserved (thanks to the changing views, which correspond to a rotated view of the one or more objects) as the viewer moves around the display 600, as shown in FIG. 22A (corresponding to a first view) and FIG. 22B (corresponding to a second view).

A viewing angle separation (at a given viewing distance) resulting in a different image arriving at a viewer's left eye from the image arriving at a viewer's right eye is henceforth referred to a stereoscopic angle.

The lenticular lens 640 may have any suitable configuration and structure and may be made of any suitable material. The lenticular lens 640 is preferably one-dimensional (e.g., cylindrical lenses arranged in columns), but may additionally or alternatively be a two-dimensional lenticular lens, fly-eye lens array, or integral imaging lens array. Note that while there is preferably a correlation between addressable segments (e.g., pixels) of the light source 610 and the lenticular lens 640, the lens columns of the lenticular lens 640 need not be at a particular orientation relative to the light source 610. For example, while columns of the lenticular lens 640 may be aligned with pixel columns, they may also be offset at an angle (which allows the resolution loss due to image slicing to be apportioned across both image pixels columns and rows, rather than only one of these). This technique is described further in U.S. Pat. No. 6,064,424. Image slicing or division (of light source 610 output) may be accomplished in any manner to achieve a desired viewing result.

The display 600 may include multiple lenticular lenses 640 and/or other lenses to produce a desired optical effect. For example, 1D lenticular lenses may be stacked at different orientations to create 2D angular view dependence (thus simulating the effect of a fly-eye lens).

The display 600 may be structured in any of the manners described for the display 100 (see, for example, FIGS. 6A-6C, FIG. 11, FIG. 12) with the addition of the lenticular lens 640 between the light source 610 and other components of the display 600.

Similar to the display 100, the display 600 may include any suitable optical components (e.g., mirrors, lenses, filters, polarizers, etc.). For example, the lenticular lens 640 may include a polarizing laminate (or other polarizer) if the light source 610 is unpolarized (or in any other scenario), enabling contrast enhancement similar to in the display 100.

The display 600 may additionally or alternatively include assistant displays, onboard computers and/or contextual lighting systems similar to those described for the display 100.

In one variation of an invention embodiment, the display 600 includes a tracking sensor that tracks viewer eye or head motion. In this embodiment, the display 600 alters output of the light source 610 based on the position and/or orientation of viewers. For example, while user head movement (around the display 600) in the horizontal plane may be accounted for by the superstereoscopic views produced by the display 600 (e.g., revolving left resulting in a rotated view of the object displayed by the display 600), vertical movement may not be. In such an instance, head tracking/eye tracking data may be used to determine viewer vertical orientation relative to the image, and the output of the light source 210 may be modified in response (e.g., if a viewer moves her head up ten degrees relative to the object, the object view displayed to her is shifted as if the object was a physical three-dimensional object). Since individual viewers may only see a subset of stereoscopic views at a given time and position, light source 610 output may be modified for only the views seen by a particular viewer (and may be modified differently for views seen by another viewer).

Similar to the display 100, the display 600 may incorporate microlens arrays or Fresnel lenses. These optical components may be oriented in any manner with respect to the lenticular lens 640.

Figure 23:
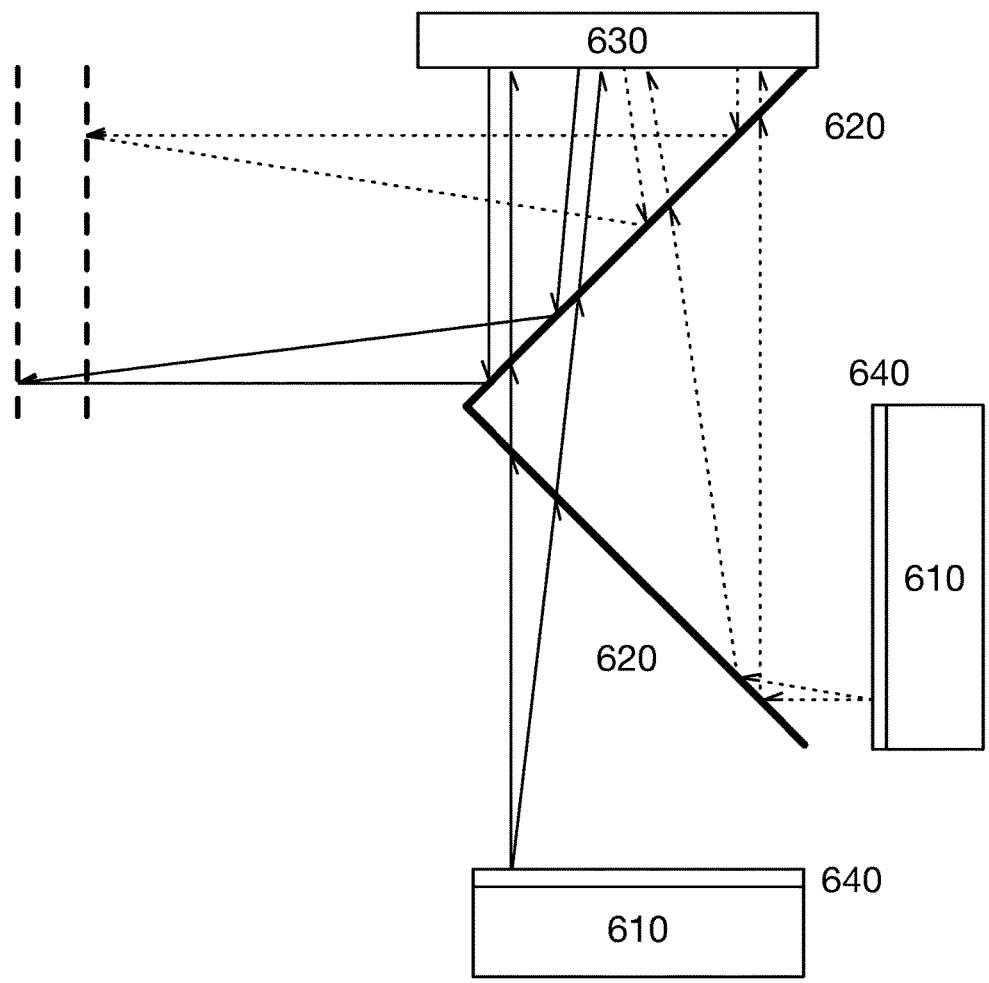
FIG. 23 is a diagram view of a system of a preferred embodiment.

As with the display 100, the display 600 may combine its components a variety of configurations; for example, a two-layer superstereoscopic display 600 may incorporate two light sources 610 and two beamsplitting modules 620 as shown in FIG. 23.

7. Dual-Perspective Flat Superstereoscopic Image Retroreflecting Display

Figure 24:
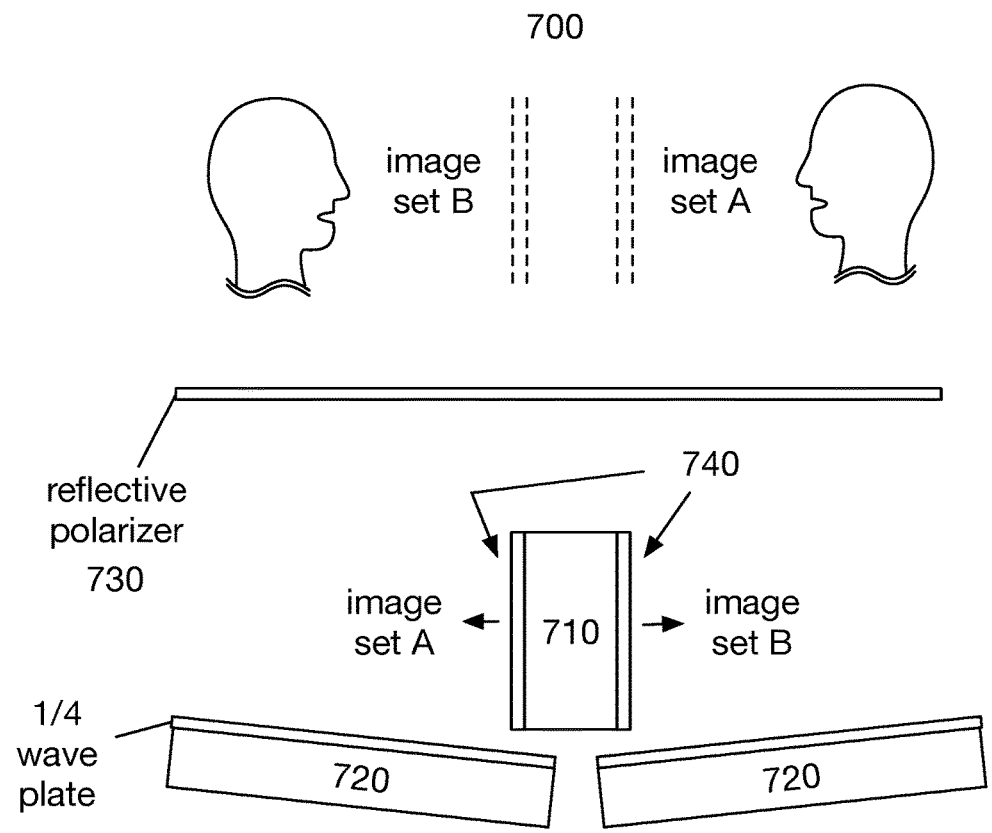
FIG. 24 is a diagram view of a system of a preferred embodiment.

A dual-perspective flat superstereoscopic image retroreflecting display 700 includes a light source 710, a retroreflector module 720, a reflective polarizer 730, and a lenticular lens 740 as shown in FIG. 24. The display 700 is substantially similar to the display 300, with the addition of lenticular lenses (as described in the display 600) to produce multiple views (hence, image sets A and B instead of image A and B) for both viewers A and B. The display 700 may additionally or alternatively include assistant displays, onboard computers and/or contextual lighting systems similar to those described for the display 100.

The display 700 may additionally or alternatively be constructed with a non-polarizing beamsplitter in place of the reflective polarizer 730, similar to the display 100 (in which case the light source 710 need not necessarily be polarized).

While most of the systems described are presented in their flat and rectangular forms, a number of structural variations that are desirable in certain applications are possible, including curving the source imager (for a curved aerial image) or different shapes of the source imager (or any other optics of the systems described herein).

As a person skilled in the art will recognize from the previous detailed description and from the figures and claims, modifications and changes can be made to the preferred embodiments of the invention without departing from the scope of this invention defined in the following claims.

We claim:

1. A persistent image retroreflecting display comprising:
a first light source that generates a first light output; wherein the first light output has a first linear polarization;
a retroreflector module adjacent a first side of the first light source;
a quarter waveplate coupled to the retroreflector module and adjacent the first light source; and
a reflective polarizer positioned between the first light source and a viewer of the display;
wherein the first light source transmits the first light output to the reflective polarizer; wherein the reflective polarizer initially reflects the first light output to the quarter waveplate; wherein the quarter waveplate converts the first light output to a first circular polarization and transmits the first light output to the retroreflector module; wherein the retroreflector module reflects the first light output back to the quarter waveplate, converting the first light output to a second circular polarization orthogonal to the first circular polarization; wherein the quarter waveplate converts the first light output to a second linear polarization orthogonal to the first linear polarization; wherein the reflective polarizer transmits the first light output and thereafter the first light output converges to a first visible real image in free space; wherein the first light source, retroreflector module, and quarter waveplate move in rotary oscillation in a direction perpendicular to an optical axis of the light source; wherein the first light output is modulated as the first light source, retroreflector module, and quarter waveplate move in rotary oscillation.

2. The display of claim 1, further comprising a transparent assistant display positioned between the first visible real image and the first beam splitter module.

3. The display of claim 1, wherein the retroreflector module comprises one of a cat's eye retroreflector array and a dihedral corner reflecting array.

4. The display of claim 3, wherein the retroreflector module further comprises a microlens array that increases focusing performance of the retroreflector module; wherein the microlens array comprises structures perpendicular to the retroreflector module that block errant reflections.

5. The display of claim 4, wherein the light source is an array of light emitting diodes.

6. A persistent image retroreflecting display comprising:
a first light source that generates a first light output; wherein the first light output has a first linear polarization;
a retroreflector module adjacent a first side of the first light source;
a quarter waveplate coupled to the retroreflector module and adjacent the first light source; and
a reflective polarizer positioned between the first light source and a viewer of the display;
wherein the first light source transmits the first light output to the reflective polarizer; wherein the reflective polarizer initially reflects the first light output to the quarter waveplate; wherein the quarter waveplate converts the first light output to a first circular polarization and transmits the first light output to the retroreflector module; wherein the retroreflector module reflects the first light output back to the quarter waveplate, converting the first light output to a second circular polarization orthogonal to the first circular polarization; wherein the quarter waveplate converts the first light output to a second linear polarization orthogonal to the first linear polarization; wherein the reflective polarizer transmits the first light output and thereafter the first light output converges to a first visible real image in free space; wherein the first light source, retroreflector module, and quarter waveplate move in translational oscillation in a direction perpendicular to an optical axis of the light source; wherein the first light output is modulated as the first light source, retroreflector module, and quarter waveplate move in translational oscillation.

7. The display of claim 6, further comprising a transparent assistant display positioned between the first visible real image and the first beam splitter module.

8. The display of claim 6, wherein the retroreflector module comprises one of a cat's eye retroreflector array and a dihedral corner reflecting array.

9. The display of claim 8, wherein the retroreflector module further comprises a microlens array that increases focusing performance of the retroreflector module; wherein the microlens array comprises structures perpendicular to the retroreflector module that block errant reflections.

10. The display of claim 9, wherein the light source is an array of light emitting diodes.

11. A persistent image retroreflecting display comprising:
a first light source that generates a first light output; wherein the first light output has a first linear polarization;
a retroreflector module adjacent a first side of the first light source;
a quarter waveplate coupled to the retroreflector module and adjacent the first light source; and
a reflective polarizer positioned between the first light source and a viewer of the display;
wherein the first light source transmits the first light output to the reflective polarizer; wherein the reflective polarizer initially reflects the first light output to the quarter waveplate; wherein the quarter waveplate converts the first light output to a first circular polarization and transmits the first light output to the retroreflector module; wherein the retroreflector module reflects the first light output back to the quarter waveplate, converting the first light output to a second circular polarization orthogonal to the first circular polarization; wherein the quarter waveplate converts the first light output to a second linear polarization orthogonal to the first linear polarization; wherein the reflective polarizer transmits the first light output and thereafter the first light output converges to a first visible real image in free space; wherein the first light source, retroreflector module, and quarter waveplate move in continuous rotation around an axis perpendicular to an optical axis of the light source; wherein the first light output is modulated as the first light source, retroreflector module, and quarter waveplate move in continuous rotation.

12. The display of claim 11, further comprising a transparent assistant display positioned between the first visible real image and the first beam splitter module.

13. The display of claim 11, wherein the retroreflector module comprises one of a cat's eye retroreflector array and a dihedral corner reflecting array.

14. The display of claim 13, wherein the retroreflector module further comprises a microlens array that increases focusing performance of the retroreflector module; wherein the microlens array comprises structures perpendicular to the retroreflector module that block errant reflections.

15. The display of claim 14, wherein the light source is an array of light emitting diodes.

16. A persistent image retroreflecting display comprising:
a first light source that generates a first light output;
a first beam splitter module; and a retroreflector module oriented at ninety degrees relative to the first light source; wherein the first light source transmits the first light output to the first beam splitter module; wherein the first beam splitter module splits the first light output into a first reflected component and a second transmitted component of the first light output; wherein the first beam splitter module reflects the first reflected component to the retroreflector module; wherein the retroreflector module retroreflects the first reflected component back to the first beam splitter module; wherein the first beam splitter module splits the first reflected component into a third reflected component and a fourth transmitted component; wherein the fourth transmitted component converges to a first visible real image in free space; wherein the first light source and retroreflector module move in rotary oscillation in a direction perpendicular to an optical axis of the fourth transmitted component; wherein the first light output is modulated as the first light source and retroreflector module move in rotary oscillation.

17. A persistent image retroreflecting display comprising:
a first light source that generates a first light output;
a first beam splitter module; and
a retroreflector module oriented at ninety degrees relative to the first light source; wherein the first light source transmits the first light output to the first beam splitter module; wherein the first beam splitter module splits the first light output into a first reflected component and a second transmitted component of the first light output; wherein the first beam splitter module reflects the first reflected component to the retroreflector module; wherein the retroreflector module retroreflects the first reflected component back to the first beam splitter module; wherein the first beam splitter module splits the first reflected component into a third reflected component and a fourth transmitted component; wherein the fourth transmitted component converges to a first visible real image in free space; wherein the first light source and retroreflector module move in translational oscillation in a direction perpendicular to an optical axis of the fourth transmitted component; wherein the first light output is modulated as the first light source and retroreflector module move in translational oscillation.

18. A persistent image retroreflecting display comprising:
a first light source that generates a first light output;
a first beam splitter module; and
a retroreflector module oriented at ninety degrees relative to the first light source; wherein the first light source transmits the first light output to the first beam splitter module; wherein the first beam splitter module splits the first light output into a first reflected component and a second transmitted component of the first light output; wherein the first beam splitter module reflects the first reflected component to the retroreflector module; wherein the retroreflector module retroreflects the first reflected component back to the first beam splitter module; wherein the first beam splitter module splits the first reflected component into a third reflected component and a fourth transmitted component; wherein the fourth transmitted component converges to a first visible real image in free space; wherein the first light source and retroreflector module move in continuous rotation around an axis perpendicular to an optical axis of the fourth transmitted component; wherein the first light output is modulated as the first light source and retroreflector module move in continuous rotation.

* * * * *